(12) United States Patent
Garrettson

(10) Patent No.: US 11,074,839 B2
(45) Date of Patent: Jul. 27, 2021

(54) METHOD FOR CONFORMING A DISPLAY PANEL

(71) Applicant: The Boeing Company, Chicago, IL (US)

(72) Inventor: Brook W. Garrettson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/739,293

(22) Filed: Jan. 10, 2020

(65) Prior Publication Data

US 2020/0152100 A1   May 14, 2020

Related U.S. Application Data

(62) Division of application No. 14/808,244, filed on Jul. 24, 2015, now Pat. No. 10,559,237.

(51) Int. Cl.
| | |
|---|---|
| *B29C 45/14* | (2006.01) |
| *G09F 21/08* | (2006.01) |
| *B29C 39/10* | (2006.01) |
| *B29C 65/70* | (2006.01) |
| *B29C 65/40* | (2006.01) |

(Continued)

(52) U.S. Cl.
CPC .............. *G09F 21/08* (2013.01); *B29C 39/10* (2013.01); *B29C 45/14* (2013.01); *B29C 45/1418* (2013.01); *B29C 45/14508* (2013.01); *B29C 65/40* (2013.01); *B29C 65/70* (2013.01); *B64D 47/02* (2013.01); *B64F 5/40* (2017.01); *B29L 2031/3076* (2013.01); *B29L 2031/723* (2013.01)

(58) Field of Classification Search
None
See application file for complete search history.

(56) References Cited

U.S. PATENT DOCUMENTS 5,098,633 A * 3/1992 Hausler ............. B29C 45/14688
264/132
5,372,771 A   12/1994 Labock
(Continued)

FOREIGN PATENT DOCUMENTS

FR          3063280       *   8/2018

OTHER PUBLICATIONS

Garrettson, "Exterior Aircraft Display System," U.S. Appl. No. 13/603,040, filed Sep. 4, 2012, 68 pages.
(Continued)

*Primary Examiner* — Edmund H Lee
(74) *Attorney, Agent, or Firm* — Yee & Associates, P.C.

(57) ABSTRACT

A method and apparatus for conforming a display panel to a surface of an aircraft structure. The method positions the display panel within a resin barrier that is located on the surface such that a cavity is formed, places a film and the display panel together, and applies a force on the display panel that causes the display panel to conform to the surface of the aircraft structure. The display panel has a shape that changes to a first shape to match a second shape of the surface of the aircraft structure. The method also injects a resin into the cavity while the force is applied, and cures the resin in the cavity while the force is applied to form a cured resin. The cured resin holds the display panel in the first shape and attaches the display panel to the surface of the aircraft structure.

20 Claims, 17 Drawing Sheets

(51) Int. Cl.
  *B64F 5/40*    (2017.01)
  *B64D 47/02*   (2006.01)
  *B29L 31/30*       (2006.01)
  *B29L 31/00*       (2006.01)

(56) References Cited

U.S. PATENT DOCUMENTS

| | | | |
|---|---|---|---|
| 5,477,024 A * | 12/1995 | Share | .................. H01H 9/182 |
| | | | 219/121.69 |
| 6,701,652 B1 | 3/2004 | McElhatton et al. | |
| 7,922,272 B2 | 4/2011 | Baird et al. | |
| 8,715,551 B2 | 5/2014 | Jiang | |
| 8,734,707 B2 * | 5/2014 | Lee | ............................. 264/494 |
| 9,268,215 B2 * | 2/2016 | Nielsen | ................ G03F 7/0002 |
| 9,272,309 B2 * | 3/2016 | Gaffie | ..................... B05D 7/00 |
| 10,864,713 B2 * | 12/2020 | Kim | .................. B29C 45/1671 |
| 2005/0083465 A1 | 4/2005 | Niiyama et al. | |
| 2011/0117326 A1 | 5/2011 | Chiu et al. | |
| 2012/0044618 A1 * | 2/2012 | Lee | ......................... 361/679.01 |
| 2012/0244246 A1 * | 9/2012 | Nielsen | .................. B82Y 40/00 |
| | | | 425/542 |
| 2014/0099481 A1 * | 4/2014 | Gaffie | ..................... B05D 7/16 |
| | | | 428/195.1 |
| 2014/0353874 A1 | 12/2014 | Han | |
| 2016/0089850 A1 | 3/2016 | Hamada et al. | |
| 2017/0025050 A1 | 1/2017 | Garrettson | |
| 2018/0295712 A1 * | 10/2018 | Heikkinen | ........ B29C 45/14377 |

OTHER PUBLICATIONS

Garrettson, "Exterior Aircraft Display System," U.S. Appl. No. 14/522,945, filed Oct. 24, 2014, 87 pages.

Office Action dated Jun. 24, 2019, regarding U.S. Appl. No. 14/808,244, 11 pages.

* cited by examiner

METHOD FOR CONFORMING A DISPLAY PANEL

CROSS-REFERENCE TO RELATED APPLICATION

This application is a divisional application of U.S. patent application Ser. No. 14/808,244, filed Jul. 24, 2015, now U.S. Pat. No. 10,559,237, issued Feb. 11, 2020, which is herein incorporated by reference.

BACKGROUND INFORMATION

1. Field

The present disclosure relates generally to aircraft and, in particular, to displaying information on an aircraft. Still more particularly, the present disclosure relates to a method and apparatus for displaying information on the exterior of an aircraft.

2. Background

Advertisements and other messages are typically placed in advertising spaces in fixed locations. Advertisements are commonly found on billboards, buildings, and other structures. Advertisers have included other systems, other than those in fixed locations, for increasing the visibility of advertisements and other messages.

For example, advertisements are often placed on moving vehicles. These vehicles include buses, taxicabs, airplanes, and other suitable types of vehicles. In some cases, trucks have been used solely for the purpose of acting as a mobile billboard. With advertisements on vehicles, these advertisements can be seen in many more areas than may otherwise be possible based on restrictions or costs for more traditional types of advertisements.

For example, advertisements may be painted on the surface of an aircraft. In other cases, the advertisements may be placed onto the surface of an aircraft in the form of an appliqué. Some of these appliqués may be in the form of aircraft display units attached to the surface of the aircraft. Currently available display units include rigid display panels that are attached to the surface of the aircraft. These display panels may be attached to the surface of the aircraft using a bonding material such as an adhesive.

When a location for a display panel has a curved surface, the aircraft display system may be designed to include a display panel that is also curved. The curvature of the display panel, however, may vary from the curvature of the surface of the aircraft. As a result, affixing a display panel on the surface of the aircraft may require the use of a rigid tool that applies pressure to the aircraft display system in a manner that causes the display panel to conform to the curvature of the surface of the aircraft.

Changing the shape of the display panel to have a desired curvature that matches the curvature of the surface of the aircraft in a desired manner results in stresses within the display panel, aircraft surface, or both. The stresses may reduce the life of either or both the display panel and the aircraft structure. These stresses also may alter performance of the aircraft. In other cases, the stresses may result in a need for maintenance to reattach the display panel to the surface of the aircraft.

Therefore, it would be desirable to have a method and apparatus that take into account at least some of the issues discussed above, as well as other possible issues. For example, it would be desirable to have a method and apparatus that overcome the technical problem of attaching display panels to the surface of an aircraft in a manner that reduces stresses to the display panels attached to the surface of an aircraft. It would also be desirable to have a method and apparatus that overcome the need for either or both secondary bonding and application of fasteners.

SUMMARY

An embodiment of the present disclosure provides a method for conforming a display panel to a surface of an aircraft structure. The method positions the display panel within a resin barrier that is located on the surface such that a cavity is formed and applies a force on the display panel that causes the display panel to conform to the surface of the aircraft structure. The display panel has a shape that changes to a first shape to match a second shape of the surface of the aircraft structure. The method also injects a resin into the cavity while the force is applied, and cures the resin in the cavity while the force is applied to form a cured resin. The cured resin holds the display panel in the first shape and attaches the display panel to the surface of the aircraft structure.

Another embodiment of the present disclosure provides an apparatus comprising a display panel, a film attached to a top side of the display panel, and a cured resin. The display panel has structures on a bottom side that are against a surface of an aircraft structure. A force applied to the display panel conforms the display panel to have a desired shape when the structures are against the surface of the aircraft structure. The cured resin attaches the display panel to the surface of the aircraft structure. The cured resin fills a cavity defined by the film, the display panel, the surface of the aircraft structure, and a resin barrier. The cured resin also holds the display panel in the desired shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, those embodiments recognize and take into account that presently used techniques for attaching a rigid display panel or semi-flexible display panel to the surface of an aircraft may result in the display panel having a shorter than desired life, not matching the shape of the surface of the aircraft, needing maintenance for cleaning beneath the display panel, reattaching the display panel to the surface of the aircraft, resealing the display panel, or some combination thereof.

The illustrative embodiments also recognize and take into account that one solution may be to use a flexible display panel. The illustrative embodiments recognize and take into account, however, that with flexible display panels, wrinkles may be present on the display panels when the flexible display panels are attached to the surface of the aircraft.

Thus, the illustrative embodiments provide a method and apparatus for match-forming and attaching a display panel to the surface of an aircraft. In the illustrative example, match-forming is a process in which a display panel changes shape. For example, the display panel may change shape to conform to the surface of the structure. In one example, the display panel may change shape by bending such that a first surface of the display system matches a second surface of the structure on which the display panel is to be attached. The bending occurs along one or more axes. In this manner, the first shape of the display panel matches the second shape of the structure through match-forming.

In one illustrative example, the display panel is attached to the surface of an aircraft structure in a manner that reduces stress, wrinkling, or some combination thereof in the display panel. A resin barrier is formed on a surface of the aircraft structure. The display panel is positioned on the resin barrier formed on the surface of the aircraft structure such that a bottom side of the display panel is in contact with the resin barrier. A resin is placed into a cavity defined by the, display panel, a caul plate and an aircraft surface. The display panel is within the resin barrier and positioned in between the caul plate and the aircraft surface on the resin barrier. A force is applied on the display panel that is sufficient to cause spacing structures on the display panel to touch the surface of the aircraft structure such that the display unit has a desired shape and finish.

The finish may be determined by the caul plate surface. For example, if the caul plate has a smooth surface, the resin at the top of the display panel may be smooth. If the caul plate has a pattern, the resin at the top of the display panel may have the pattern. The resin is cured while the force is applied to the display panel to form a cured resin that holds the display panel on the surface of the aircraft structure with the first shape.

Figure 1:
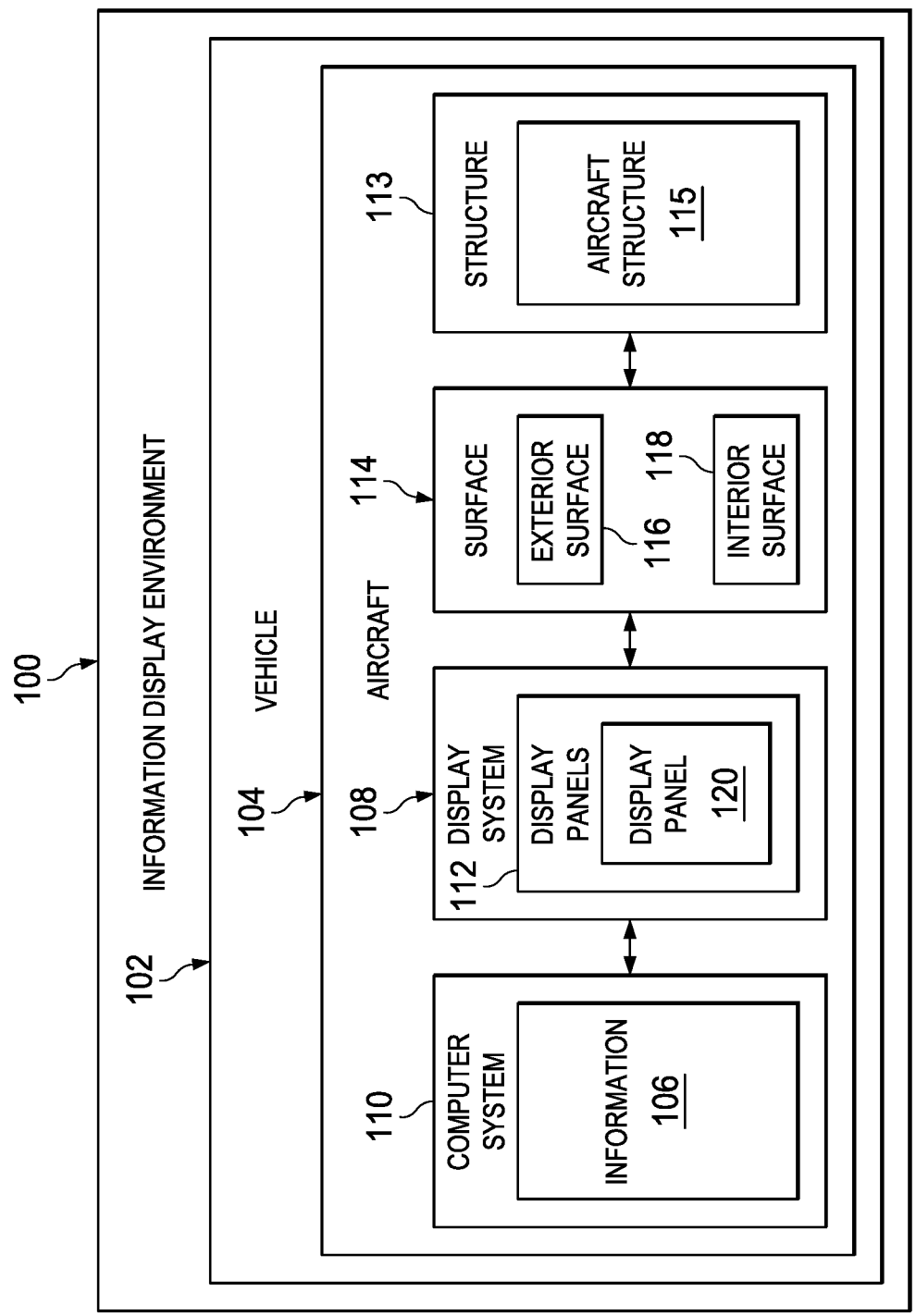
FIG. 1 is an illustration of a block diagram of an information display environment in accordance with an illustrative embodiment.

With reference now to the figures and, in particular, with reference to FIG. 1, an illustration of a block diagram of an information display environment is depicted in accordance with an illustrative embodiment. In this illustrative example, information display environment 100 includes vehicle 102 in the form of aircraft 104.

In this illustrative example, information 106 is displayed on aircraft 104 using display system 108. As depicted, display system 108 is in communication with computer system 110 and comprises a number of display panels 112. As used herein, a "number of," when used with reference to items, means one or more items. For example, a number of display panels 112 is one or more of display panels 112.

As depicted, computer system 110 is a hardware system that includes one or more data processing systems located in aircraft 104. When more than one data processing system is present, those data processing systems may be in communication with each other using a communications medium. The communications medium may be a network. Further, computer system 110 is in communication with display system 108 using the communications medium. The data processing systems may be selected from at least one of a computer, a server computer, a workstation, a tablet computer, a laptop computer, an electronic flight bag, a mobile phone, some other suitable data processing system, an aircraft device, a cockpit interface device, or avionics gear.

As depicted, computer system 110 identifies information 106, generates information 106, or some combination thereof. Computer system 110 may send information 106 to display system 108 for display on surface 114 of aircraft 104 by the number of display panels 112. In this illustrative example, surface 114 is a surface on structure 113 in the form of aircraft structure 115 when vehicle 102 is aircraft 104.

In the illustrative example, surface 114 is selected from at least one of exterior surface 116 or interior surface 118. As depicted, one or more of display panels 112 may be located on at least one of exterior surface 116 or interior surface 118 of aircraft 104.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, information 106 may be displayed in different forms. For example, information 106 may be advertisements, flight information, ground crew information, an airline logo, a warning, or other suitable information depending on whether information 106 is displayed on exterior surface 116 or interior surface 118 of aircraft 104.

As depicted, display panel 120 in the number of display panels 112 is attached to surface 114 of aircraft structure 115 for aircraft 104. The attachment is such that display panel 120 is substantially flush to exterior surface 116 of aircraft 104 when display panel 120 is attached to exterior surface 116 of aircraft 104.

For example, if exterior surface 116 of aircraft 104 is substantially flat, display panel 120 maintains the substantially flat surface for exterior surface 116 of aircraft 104. If exterior surface 116 of aircraft 104 has a curve, display panel 120 at that location has a similar curve such that display panel 120 maintains the curve as desired for the aircraft.

In other words, display panel 120 may be considered part of exterior surface 116 for performance purposes of aircraft 104. In this manner, the aerodynamic properties for exterior surface 116 of aircraft 104 may remain at a desired level of performance.

Figure 2:
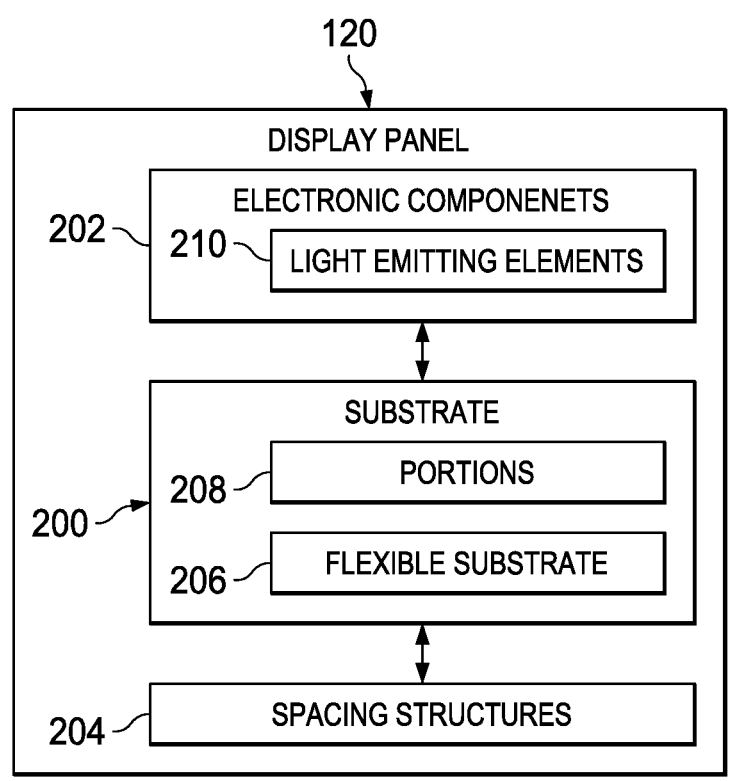
FIG. 2 is an illustration of a block diagram of a display panel in accordance with an illustrative embodiment.

With reference now to FIG. 2, an illustration of a block diagram of a display panel is depicted in accordance with an illustrative embodiment. As depicted, display panel 120 is a hardware device that is configured to display information 106 in FIG. 1. Information 106 may be, for example, an image. In the illustrative examples, the same reference numeral may be used in more than one figure. This reuse of a reference numeral in different figures represents the same element in the different figures.

In this illustrative example, display panel 120 may be implemented using a number of different types of display technologies. For example, display panel 120 may be selected from at least one of a light-emitting diode display, an organic light-emitting diode display, a plasma display, a quantum dot display, a liquid crystal display, or other suitable types of display devices. For example, other types of electroluminescent display devices may be used.

An example of components that may be used to implement display panel 120 is depicted in FIG. 2. In this illustrative example, display panel 120 includes substrate 200, electronic components 202, and spacing structures 204.

As depicted, substrate 200 is flexible substrate 206. Substrate 200 is flexible in a number of axes. For example, substrate 200 may be flexible on one axis, two axes, or some other number of axes.

In the illustrative example, substrate 200 may be designed to conform to a desired shape or flex during use. This conformance of substrate 200 to the desired shape or flexing of substrate 200 during use occurs without undesired stresses that may result in cracking, erosion, discoloration, weathering, debonding, or other undesired conditions.

Substrate 200 may be formed using various types of substrates for circuits including those used for flexible printed circuits. For example, substrate 200 may be implemented using a flexible plastic, a polyamide film, a transparent conductive polyester film, a polyether ether ketone (PEEK) substrate, or some other suitable type of substrate.

Substrate 200 may be comprised of a number of portions 208. When more than one portion is present in the number of portions 208, those portions may be connected to each other. For example, the number of portions 208 may take the form of a number of strips, squares, rectangles, or other suitable shapes.

In the illustrative example, electronic components 202 are associated with substrate 200. In some illustrative examples, electronic components 202 and their connections may form substrate 200.

When one component is "associated" with another component, the association is a physical association in the depicted examples. For example, a first component, an electronic component in electronic components 202, may be considered to be physically associated with a second component, substrate 200, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as a part of the second component, an extension of the second component, or both.

In this illustrative example, electronic components 202 include light-emitting elements 210. As depicted, light-emitting elements may be selected from at least one of a light-emitting diode, an organic light-emitting diode, a plasma cell, a liquid crystal cell, an infrared transmitter, an ultraviolet light transmitter, or some other suitable electroluminescent component that emits light. Electronic components 202 may also include other components, such as video control circuits, communications circuits, or other suitable electronic components for use in display panel 120.

As depicted, electronic components 202 may be in the form of a chip within a case. The case may be a package that encapsulates, seals, or encapsulates and seals the chip as currently used in integrated circuits. In some illustrative examples, the resin used with display panel 120 may function as the case or package.

Spacing structures 204 are structures associated with substrate 200. Spacing structures 204 may contact surface 114 when installing display panel 120 on surface 114 of aircraft structure 115. In some illustrative examples, spacing structures 204 may include some or all of electronic components 202. In other words, electronic components 202 may also function as spacing structures 204 in some illustrative examples. Spacing structures 204 are used to define the shape of display panel 120 when display panel 120 is attached to surface 114.

Display panel 120 may include other components not shown. For example, electrical connections between electronic components 202 may also be present.

Figure 3:
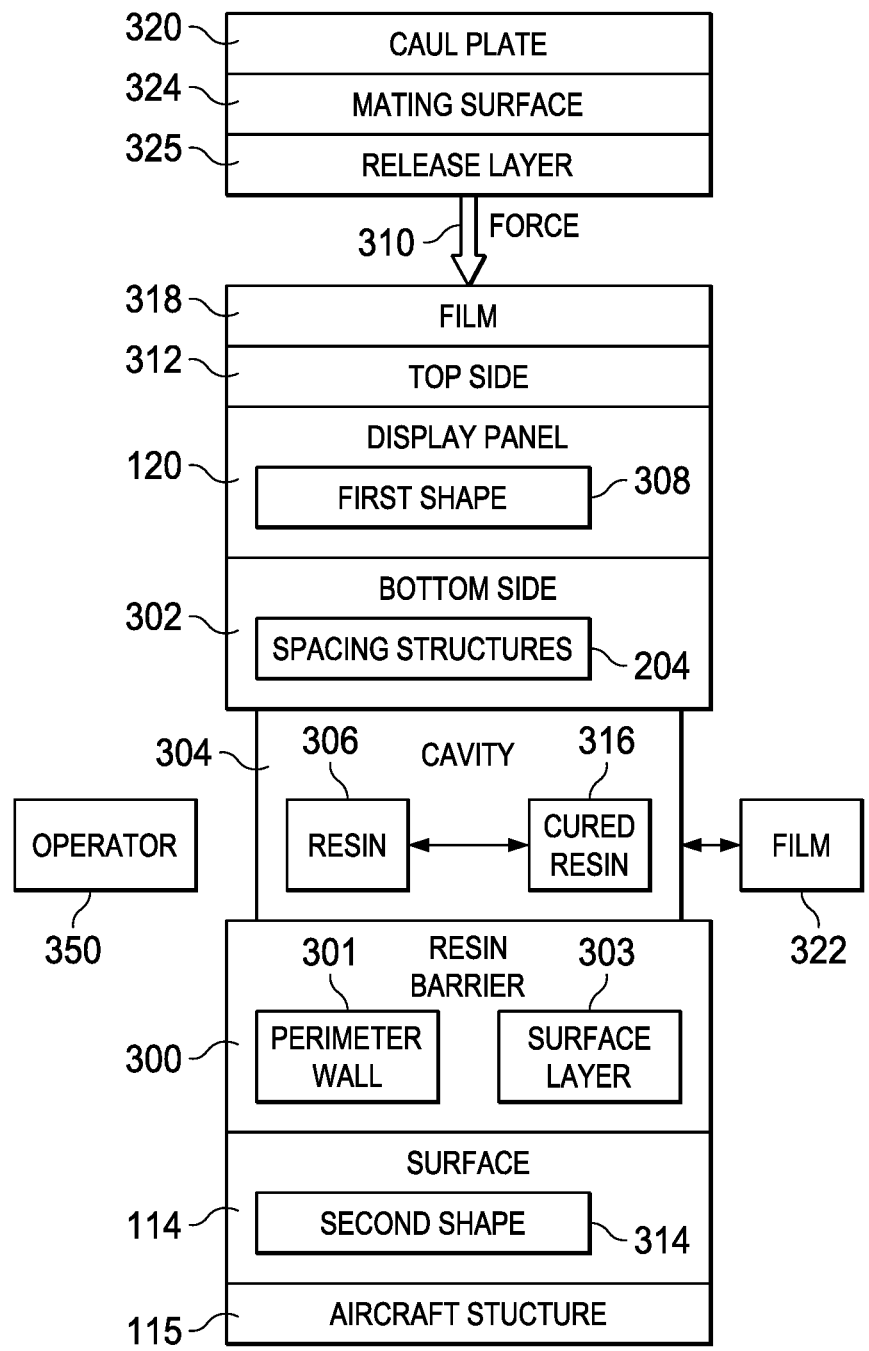
FIG. 3 is an illustration of a block diagram of a process for attaching a display panel to a surface of an aircraft in accordance with an illustrative embodiment.

Turning to FIG. 3, an illustration of a block diagram of a process for attaching a display panel to a surface of an aircraft is depicted in accordance with an illustrative embodiment. As depicted, display panel 120 may be attached to surface 114 of aircraft structure 115. The attachment may be made in a manner that reduces stress, maintenance, and other undesired conditions that occur with currently used display panels.

In this illustrative example, resin barrier 300 is formed on surface 114. Resin barrier 300 is a barrier for resin 306. As depicted, resin barrier 300 includes perimeter wall 301 and surface layer 303.

In the illustrative example, perimeter wall 301 is configured to surround display panel 120. Surface layer 303 is located within a perimeter defined by perimeter wall 301. In some illustrative examples, surface layer 303 may be omitted. In this illustrative example, resin barrier 300 is a material selected from at least one of a polymer, an insulating polymer, a film adhesive, a gel coat, an elastomer, an insulating elastomer, a primer, or some other suitable material.

Display panel 120 is placed within resin barrier 300 as formed on surface 114 of aircraft structure 115. In other words, display panel 120 is placed inside of perimeter wall 301 when display panel 120 is placed within resin barrier 300. Display panel 120 is placed together with surface layer 303 within the wall of perimeter wall 301. The placement of display panel 120 such that bottom side 302 of display panel 120 is in contact with resin barrier 300. In this illustrative example, cavity 304 is defined by display panel 120 positioned on resin barrier 300. Caul plate 320 may be positioned on display panel 120. For example, bottom side 302 of display panel 120, resin barrier 300, and surface 114 encompassed by resin barrier 300 may define cavity 304.

As depicted, resin 306 is placed into cavity 304. For example, resin 306 may be injected into cavity 304 using an injection device such as a syringe, an end effector on a robotic arm, a vacuum pump, or some other suitable device. The injection may be made by inserting the injection device through resin barrier 300. In another illustrative example, a valve may be formed within resin barrier 300 to allow for placement of resin 306 into cavity 304.

As depicted, resin 306 is a resin that holds or maintains display panel 120 in first shape 308 after resin 306 is cured. Additionally, resin 306 may be selected from a resin that will bond or otherwise attach display panel 120 to surface 114. For example, resin 306 may be selected from at least one of a substantially transparent resin, a thermoset resin, an epoxy, a polyimide, a polyurethane, a silicone, an acrylic, a phenolic, or some other suitable material.

In addition to attaching display panel 120 to surface 114, resin 306 also may function to seal display panel 120. Further, resin 306 also may encapsulate electronic components 202.

Force 310 is applied to top side 312 of display panel 120 such that display panel 120 conforms to surface 114 of aircraft structure 115. In this illustrative example, force 310 may be applied perpendicular to surface 114 of aircraft structure 115 over the area of surface 114. For example, force 310 may be in the form of a pressure. Force 310 in the form of pressure may be generated by applying a vacuum within the cavity or from an exterior source.

In this illustrative example, when force 310 is applied to display panel 120, display panel 120 bends and spacing structures 204 contact surface 114. In the illustrative example, when display panel 120 bends, the bending may be along one or more axes. The bending occurs such that wrinkles in display panel 120 are reduced or avoided. In other words, display panel 120 changes shape in a manner that conforms to surface 114 of aircraft structure 115.

The contact of spacing structures 204 causes substrate 200 in display panel 120 to bend such that display panel 120 has a shape that changes to first shape 308. Thus, the shape, size, number, and location of spacing structures 204 may be selected to obtain first shape 308 that matches second shape 314 when force 310 is applied causing first shape 308 to change to match second shape 314.

For example, force 310 is applied to top side 312 of display panel 120 that is sufficient to cause spacing structures 204 on bottom side 302 of display panel 120 to touch surface 114 of aircraft structure 115. Spacing structures 204 touching surface 114 causes display panel 120 to have first shape 308.

In this depicted example, display panel 120 is a flexible display panel that bends to have first shape 308 that is substantially the same as second shape 314 of surface 114 without an undesired amount of stress imparted within display panel 120. In other words, bending display panel 120 does not cause stresses inside of display panel 120 that would result in inconsistencies in substrate 200 that may require placement or repair of substrate 200 sooner than expected or desired.

As depicted, first shape 308 of display panel 120 substantially conforms to second shape 314 of surface 114. For example, if second shape 314 of surface 114 is a curve, first shape 308 is also a curve. In the illustrative example, first shape 308 is the same or equal to second shape 314 when the shapes are matched.

In this illustrative example, the location and configuration of spacing structures 204 on bottom side 302 of display panel 120 are used to define first shape 308 of display panel 120 when display panel 120 is attached to surface 114. The configuration may include the dimensions, materials, or other parameters for spacing structures 204.

Resin 306 is cured while force 310 is applied to display panel 120 to form cured resin 316 that holds display panel 120 on surface 114 aircraft structure 115 with first shape 308. Cured resin 316 may attach display panel 120 to surface 114 of aircraft structure 115. For example, resin 306 attaches display panel 120 to surface 114 by at least one of forming a bond to surface 114, mechanically securing display panel 120, or some other suitable combination of mechanisms. After resin 306 is cured, resin barrier 300 may be removed. Alternatively, resin barrier 300 may remain in place.

When attached to surface 114 by cured resin 316, display panel 120 has first shape 308 that substantially conforms to second shape 314 of surface 114. This type of attachment may be desirable when surface 114 is exterior surface 116. First shape 308 may be such that a desired airflow is present during operation of aircraft 104 when display panel 120 is attached to exterior surface 116 such that display panel 120 substantially conforms to exterior surface 116.

In the illustrative example, force 310 is applied through the use of caul plate 320. As depicted, caul plate 320 is semi-flexible. In other words, caul plate 320 may be flexible along at least one axis. Further, the flexibility of caul plate 320 is selected to be low enough such that caul plate 320 maintains a shape that is substantially similar to match second shape 314 for exterior surface 116.

The flexibility of caul plate 320 is selected such that caul plate 320 has a shape that contacts spacing structures 204 that may be located on top side 312 of display panel 120. The contact is such that first shape 308 for display panel 120 is a desired shape.

As depicted, caul plate 320 is positioned against top side 312 of display panel 120. Force 310 is applied to top side 312 of display panel 120 through caul plate 320 that causes display panel 120 to conform to surface 114 of aircraft structure 115. When film 318 is present on top side 312, caul plate 320 contacts film 318 as placed on display panel 120.

Also, caul plate 320 has mating surface 324. In this illustrative example, mating surface 324 is the surface on caul plate 320 that contacts display panel 120 to apply force 310. Mating surface 324 may include release layer 325 on mating surface 324. In the illustrative example, release layer 325 may be part of mating surface 324 or may be a separate film. As depicted, release layer 325 may be formed from a material that provides properties selected from at least one of anti-stick properties, inertness to chemicals used during manufacturing, or other suitable properties.

In one illustrative example, film 318 may be placed on display panel 120. Film 318 may be substantially transparent. In some illustrative examples, portions of film 318 may have a nontransparent area for a designer pattern. Film 318 may also provide electro-static charge dissipation.

Additionally, caul plate 320 may form physical features or pigmented patterns in film 318 through thermal mechanisms. The thermal mechanism may be any curing system that generates heat to cure resin 306. The thermal mechanisms applied to through caul plate 320 may also cure resin 306. If film 318 is not present, caul plate 320 may form physical features or pigmented patterns in cured resin 316.

Film 318 may be placed on top side 312 of display panel 120. Film 318 may be a protective layer for display panel 120. Depending on the design, display panel 120 and film 318 may also define cavity 304. For example, if substrate 200 has portions 208 in the form of strips, gaps may be present between the strips. Film 318 may cover the gaps between the strips in addition to the strips themselves.

Film 318 may be placed on display panel 120 at different times. For example, film 318 may be placed on display panel 120 prior to placing display panel 120 within resin barrier 300. When placed on display panel 120 prior to placing display panel 120 within resin barrier 300, film 318 may be attached to display panel 120. The attachment may be made through an adhesive or some other suitable mechanism.

As another illustrative example, film 318 may be placed on display panel 120 after resin 306 has been cured. In still other illustrative examples, film 318 may be omitted or removed after curing resin 306.

Further, film 318 also may act as a release film with respect to caul plate 320. In another illustrative example, film 318 may be removed after resin 306 is cured. Another film may replace film 318. When film 318 is not used, caul plate 320 may define cavity 304 along with display panel 120, resin barrier 300, and surface 114 within resin barrier 300.

In another illustrative example, spacing structures 204 also may be located on top side 312 of substrate 200 and display panel 120. Spacing structures 204 may define a portion of cavity 304 on top side 312 when caul plate 320 is placed against display panel 120 and force 310 is applied.

For example, spacing structures 204 on top side 312 may touch caul plate 320. When film 318 is located on display panel 120, spacing structures 204 may touch caul plate 320 indirectly through film 318.

As depicted, resin 306 may flow within cavity 304 to encapsulate or seal electronic components 202 that may be found on both bottom side 302 and top side 312 of substrate 200 for display panel 120. As a result, resin 306 within cavity 304 on top side 312 may also contribute to first shape 308 of display panel 120. In other words, cured resin 316 may be considered part of display panel 120 in addition to attaching display panel 120 to surface 114.

Display panel 120 with cured resin 316 may have a desired shape with respect to surface 114. For example, the profile for the cross-section of surface 114 with display panel 120 may have a desired shape for performance purposes. For example, the profile of surface 114 with display panel 120 may provide a desired airflow for aircraft 104.

In still another illustrative example, film 322 may be placed on surface 114 within the area defined by resin barrier 300. Film 322 may be an attachment film. For example, resin 306 may be attached to film 322. In turn, film 322 may be selected such that film 322 attaches or sticks to surface 114.

With this configuration, film 322 may provide separation between electronic components 202 on bottom side 302 of substrate 200 and surface 114. Further, film 322 may have features that define air gaps or channels that are not filled by cured resin 316.

The application of film 322 may include using a surface preparation or primer. Further, attaching display panel 120 to surface 114 may include a surface preparation or primer.

The different operations described in FIG. 3 may be performed by operator 350. Operator 350 may be human operator. In other illustrative examples, operator 350 may be a robot, a robotic arm, or some other suitable type of equipment that may be used to attach display panel 120 to surface 114 of aircraft 104.

In this manner, the illustrative examples described with respect to FIGS. 1-3 provide a technical solution for attaching display panel 120 to surface 114 in a manner that overcomes the technical problem of attaching display panels to the surface of an aircraft in a manner that reduces stresses within the display panels attached to the surface of an aircraft. Additionally, the illustrative examples also may reduce stresses imparted upon aircraft structures and allow display panel 120 to match the shape of surface 114 for aircraft structure 115. Matching of the shapes may occur when the profiles match each other. The matching occurs such that display panel 120 may be attached to surface 114 in a manner that display panel 120 provides a desired airflow over aircraft 104.

The different operations illustrated provide a technical effect that reduces at least one of stress within display panel 120, the occurrence of wrinkles in display panel 120, the occurrence of undesired thickness variation, or the occurrence of disbonds between display panel 120 and surface 114 when display panel 120 is attached to surface 114. These reductions improve the overall performance of display panel 120. As a result, less rework and maintenance may occur with the use of display panel 120 attached as described in FIGS. 1-3.

The illustration of information display environment 100 and the different components and processes using those components in FIGS. 1-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, electronic components 202 may include other types of electric components in addition to light-emitting elements 210. For example, electronic components 202 may include a video controller, storage, sensors, switches, processors, integrated circuits, and other suitable electronic components for use in or with display panel 120. In yet another illustrative example, one or more operators in addition to operator 350 may perform operations to attach display panel 120 to surface 114. In another illustrative example, resin barrier 300 may be formed as part of surface 114 of aircraft structure 115 when surface 114 of aircraft structure 115 is formed. Additionally, in other illustrative examples, vehicle 102 may take other forms in addition to aircraft 104. For example, vehicle 102 may be selected from one of a spacecraft, a train, an automobile, a bus, a surface ship, or some other suitable type of vehicle.

In another illustrative example, resin barrier 300 may be formed as part of display panel 120. In yet another illustrative example, cured resin 316 may not hold display panel 120 on surface 114. Instead, display panel 120 may be removed and then attached to surface 114 through bonding using at least one of double-sided tape, adhesive, or some other bonding system. As another illustrative example, display panel 120 may be held on surface 114 by a mechanical attachment system such as fasteners, clips, screws, bolts, or some other suitable types of attachment systems.

Attachment of display panel 120 may also use any combination of the following mechanisms such as resin primary bonding using resin 306, tape and secondary adhesive bonding, a mechanical attachment system, or fasteners. The mechanical attachment system may include using hooks or cured resin 316 holding mechanical attachment features. These mechanical attachment features may be found on at least one of display panel 120 or surface 114 of aircraft structure 115.

Figure 4:
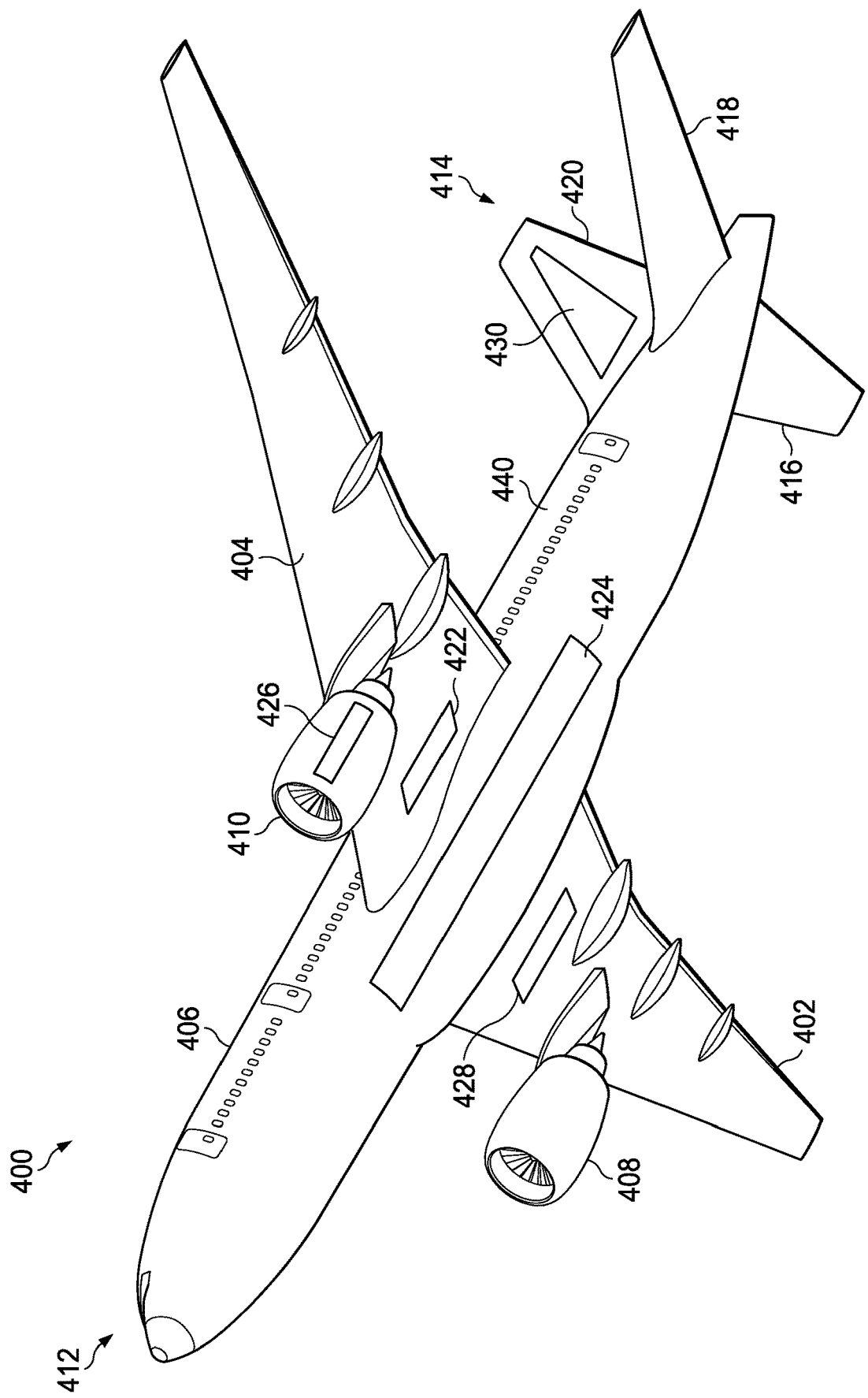
FIG. 4 is an illustration of an aircraft in accordance with an illustrative embodiment.

With reference now to FIG. 4, an illustration of an aircraft is depicted in accordance with an illustrative embodiment. In this depicted example, aircraft 400 is an example of a physical implementation for aircraft 104 shown in block form in FIG. 1.

In this illustrative example, aircraft 400 has first wing 402 and second wing 404 attached to fuselage 406. Aircraft 400 includes first engine 408 attached to first wing 402 and second engine 410 attached to second wing 404.

As depicted, fuselage 406 has nose section 412 and tail section 414. First horizontal stabilizer 416, second horizontal stabilizer 418, and vertical stabilizer 420 are attached to tail section 414 of fuselage 406.

In these illustrative examples, display panels are attached to aircraft 400. The display panels include display panel 422, display panel 424, display panel 426, display panel 428, and display panel 430 can be seen on aircraft 400. These display panels are examples of physical implementations for the number of display panels 112 shown in block form in FIG. 1.

As depicted, display panel 422, display panel 424, display panel 426, display panel 428, and display panel 430 are mounted on exterior surface 440 of aircraft 400. In particular, display panel 422, display panel 424, display panel 426, display panel 428, and display panel 430 are mounted to be substantially flush to exterior surface 440 of aircraft 400. In other words, display panel 422, display panel 424, display panel 426, display panel 428, and display panel 430 may be embedded within exterior surface 440 of aircraft 400. In this manner, undesired airflow on aircraft 400 may be reduced or avoided.

In other illustrative examples, display panels may be located in other locations in addition to or in place of the locations shown in FIG. 4. For example, display panels may be in locations such as on top surfaces, leading edges, trailing edges, lateral edges, or other locations that are flush with existing structures to provide desired airflow for surfaces.

As depicted, display panel 422 is located on second wing 404; display panel 424 is located on fuselage 406; display panel 426 is located on second engine 410; and display panel 428 is located on first wing 402, while display panel 430 is located on vertical stabilizer 420. The illustration of display panel 422, display panel 424, display panel 426, display panel 428, and display panel 430 on aircraft 400 in FIG. 4 is only an example of some locations where display panel 422, display panel 424, display panel 426, display panel 428, and display panel 430 may be located.

Additional display panels also may be present on aircraft 400, but not seen in this view. For example, a display panel also may be located on first engine 408, fuselage 406, the underside of second wing 404, the other side of vertical stabilizer 420, or in some other suitable location on aircraft 400. If winglets are used on wings, the display panel may be located on the winglet. In yet another example, another display panel may be located on the other side of fuselage 406 opposite to display panel 424 as seen on fuselage 406 upon other structures not seen in this view.

Figure 5:
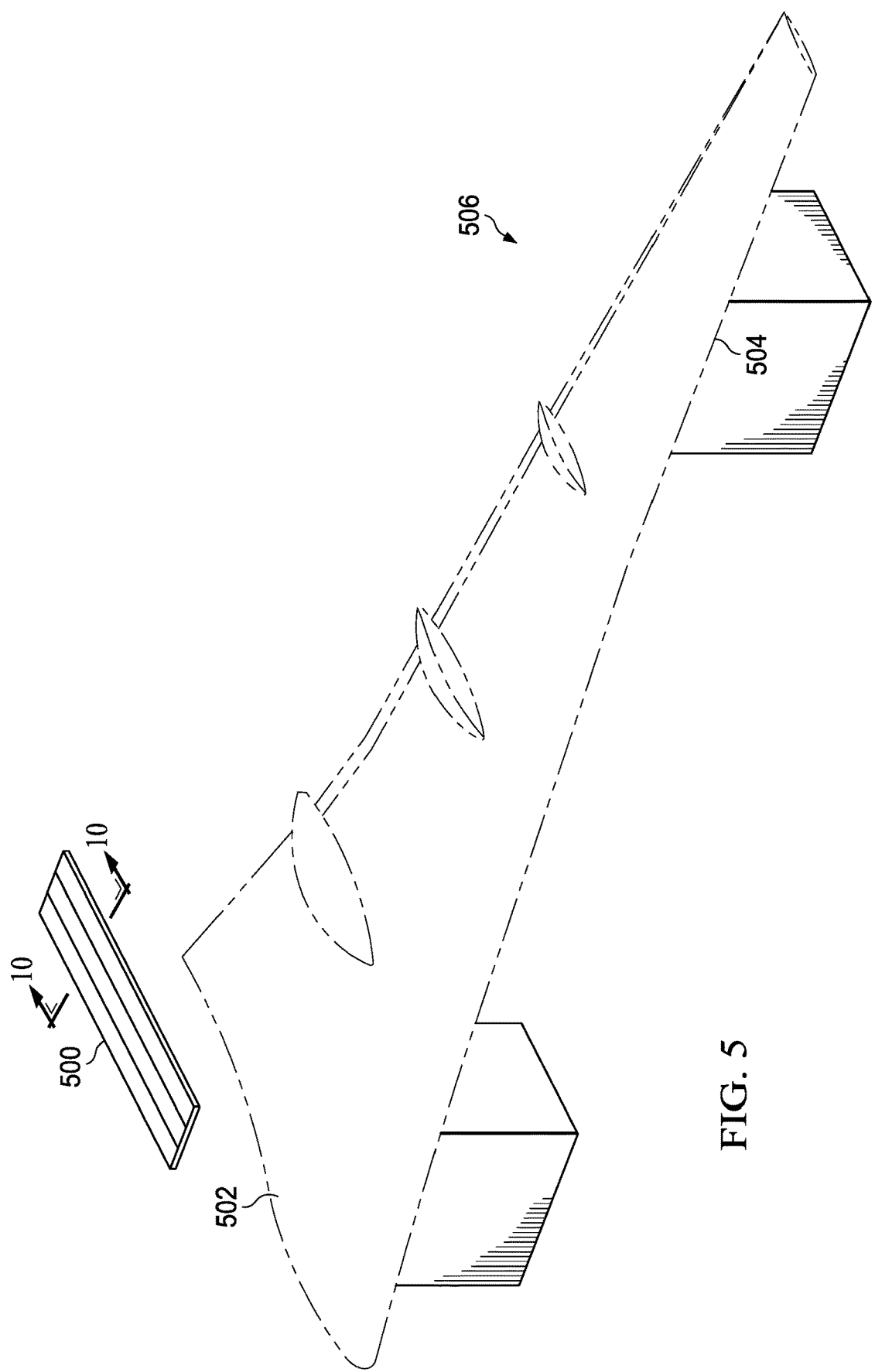
FIG. 5 is an illustration of an aircraft structure in accordance with an illustrative embodiment.

FIGS. 5-14 illustrate operations performed to attach a display panel to the surface of an aircraft structure in accordance with an illustrative embodiment. Turning first to FIG. 5, an illustration of an aircraft structure is depicted in accordance with an illustrative embodiment. In this illustrative example, display panel 500 is attached to surface 502 of aircraft structure 504. As depicted, aircraft structure 504 is wing 506 for an aircraft. Wing 506 is a composite wing in this illustrative example. In other examples, wing 506 may be a metal wing.

Display panel 500 is attached to wing 506 prior to wing 506 being attached the fuselage of an aircraft. In other illustrative examples, display panel 500 may be attached to wing 506 after wing 506 is attached to the aircraft. In another illustrative example, display panel 500 may be attached during a joining process for the wing and aircraft.

Figure 6:
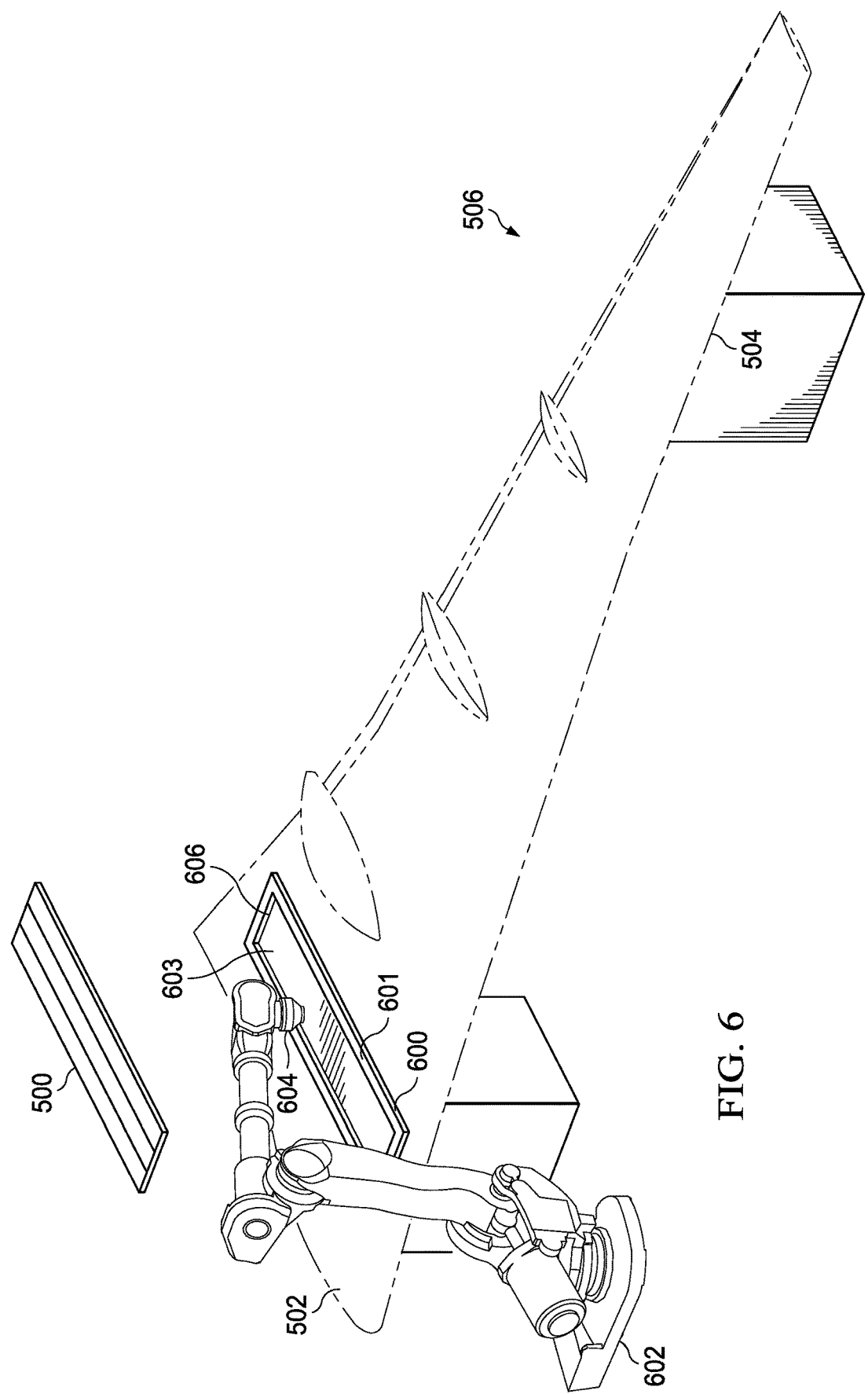
FIG. 6 is an illustration of preparing a wing to receive a display panel in accordance with an illustrative embodiment.

In FIG. 6, an illustration of preparing a wing to receive a display panel is depicted in accordance with an illustrative embodiment. In this example, resin barrier 600 is formed on surface 502 of aircraft structure 504.

As depicted, resin barrier 600 is formed by robotic arm 602 with end effector 604 depositing polymer material 606 onto surface 502 to form resin barrier 600. As depicted, resin barrier 600 has perimeter wall 601 and surface layer 603. The shape of resin barrier 600 corresponds to the periphery of display panel 500 such that display panel 500 may be placed within perimeter wall 601 of resin barrier 600.

As depicted, perimeter wall 601 may be used in conjunction with display panel 500 to define a cavity. In this example, perimeter wall 601 of resin barrier 600 may prevent resin from flowing out of the cavity when resin is placed into the cavity.

In this illustrative example, surface layer 603 is optional and may perform different functions. For example, surface layer 603 may have a function selected from at least one of a barrier to keep resin from contacting surface 502 of wing 506, an insulator for electronic components in display panel 500, or other suitable functions. Resin barrier 600 may prevent or reduce leaks through surface 502 of aircraft 400.

In the illustrative example, display panel 500 may be a single structure or formed from multiple panels connected to each other. In a similar fashion, resin barrier 600 may be a single part or formed from several parts.

Figure 7:
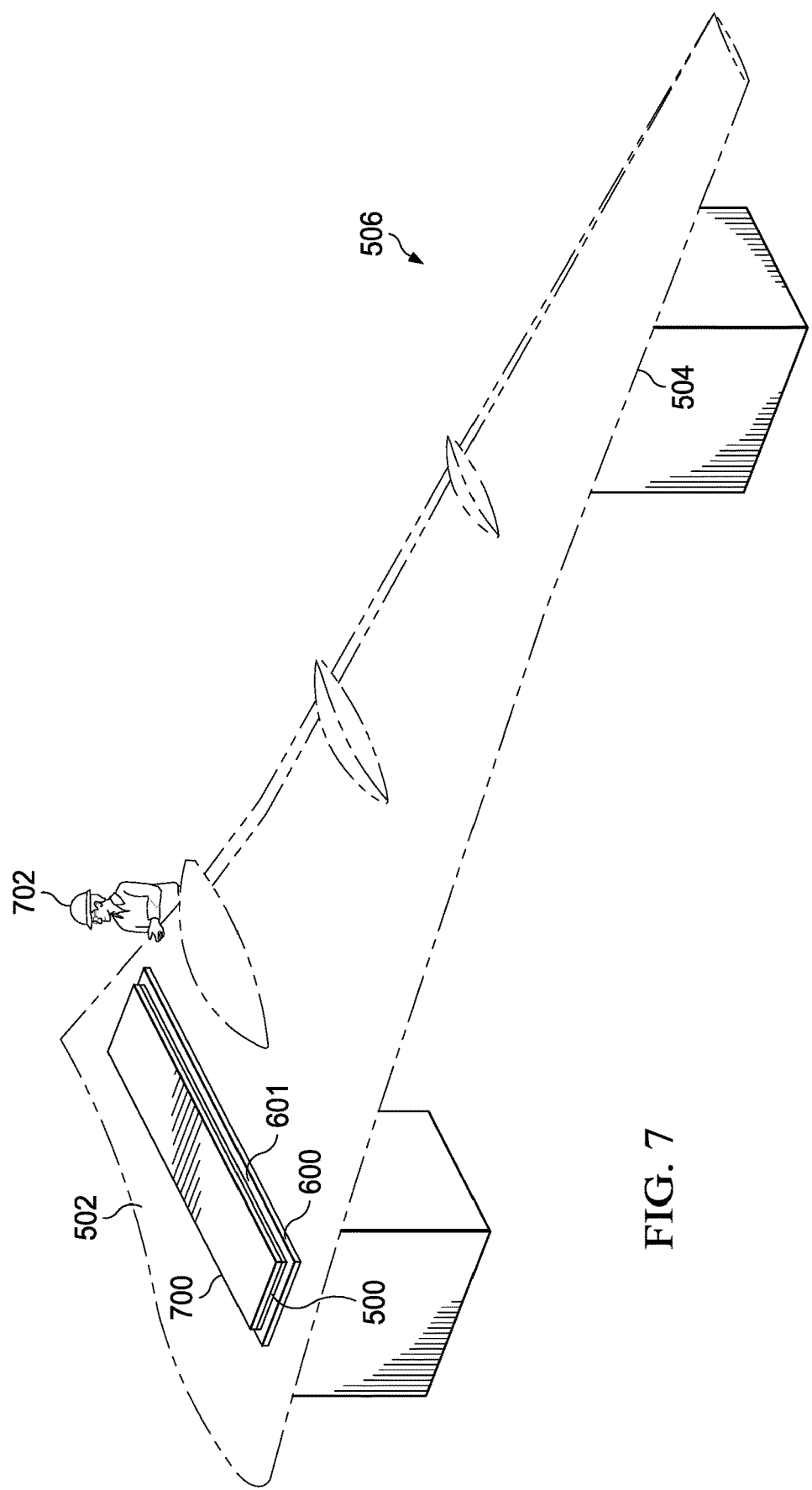
FIG. 7 is an illustration of positioning a display panel in accordance with an illustrative embodiment.

With reference now to FIG. 7, an illustration of positioning a display panel is depicted in accordance with an illustrative embodiment. In this figure, display panel 500 has been positioned within perimeter wall 601 of resin barrier 600 by human operator 702. Additionally, film 700 has been placed on display panel 500.

Figure 8A:
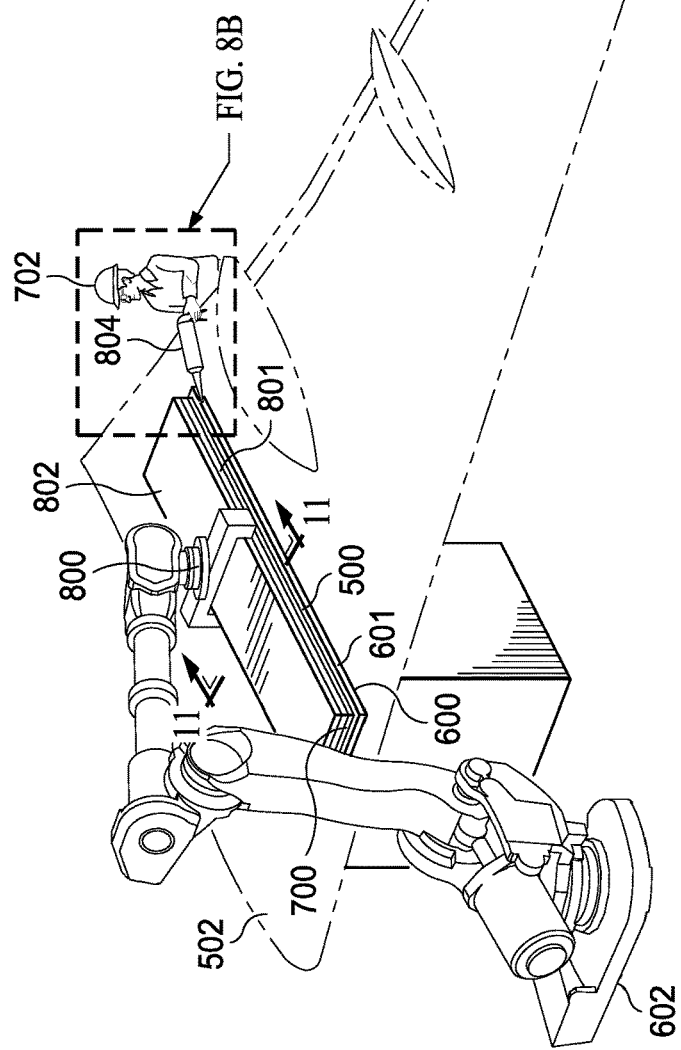
FIG. 8A is an illustration of the positioning of a caul plate in accordance with an illustrative embodiment.

Turning to FIG. 8A, an illustration of the positioning of a caul plate is depicted in accordance with an illustrative embodiment. In this depicted example, robotic arm 602 has end effector 800 that holds bladder 801 and caul plate 802. As seen in this example, caul plate 802 is positioned on film 700 and display panel 500. In this example, human operator 702 is shown injecting resin into the cavity through perimeter wall 601 of resin barrier 600 using syringe 804.

This positioning of display panel 500 within resin barrier 600, film 700, and caul plate 802 defines a cavity (not shown). Film 700 is optional in this illustrative example.

As depicted, robotic arm 602 manipulates caul plate 802 to apply a force on film 700 and display panel 500 with the resin within the cavity. In this illustrative example, force is applied when bladder 801 is inflated with a fluid. The inflation of bladder 801 causes caul plate 802 to apply force on display panel 500 with film 700 located between caul plate 802 and display panel 500. Bladder 801 may be pressurized using any fluid. Also, the fluid may be cooled or heated to change the cure time for the resin.

The force is applied such that display panel 500 is in a desired shape with respect to surface 502 to an aircraft structure 504. For example, if aircraft structure 504 has a curve in the profile, display panel 500 has a corresponding curve in the profile of display panel 500. In this illustrative example, the resin is cured with the force being applied using caul plate 802.

In this example, film 700 is shown as being placed in display panel 500. In another illustrative example, film 700 may be located on caul plate 802 and positioned on display panel 500 when caul plate 802 is positioned on display panel 500.

Figure 8B:
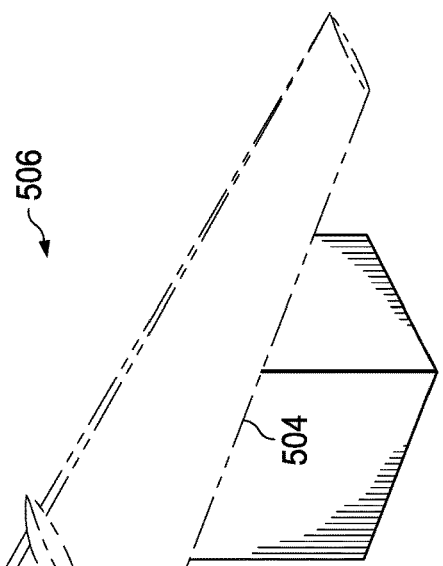
FIG. 8B is an illustration of the placement of a syringe in a resin barrier in accordance with an illustrative embodiment.

With reference now to FIG. 8B, an illustration of the placement of a syringe in a resin barrier is depicted in accordance with an illustrative embodiment. As depicted, an enlarged view of human operator 702 is shown in FIG. 8A. In this view, syringe 804 is shown as being inserted through resin barrier 600 into the cavity (not shown). This placement of syringe 804 occurs after caul plate 802 is in place. In this manner, resin may be injected into the cavity.

Figure 9:
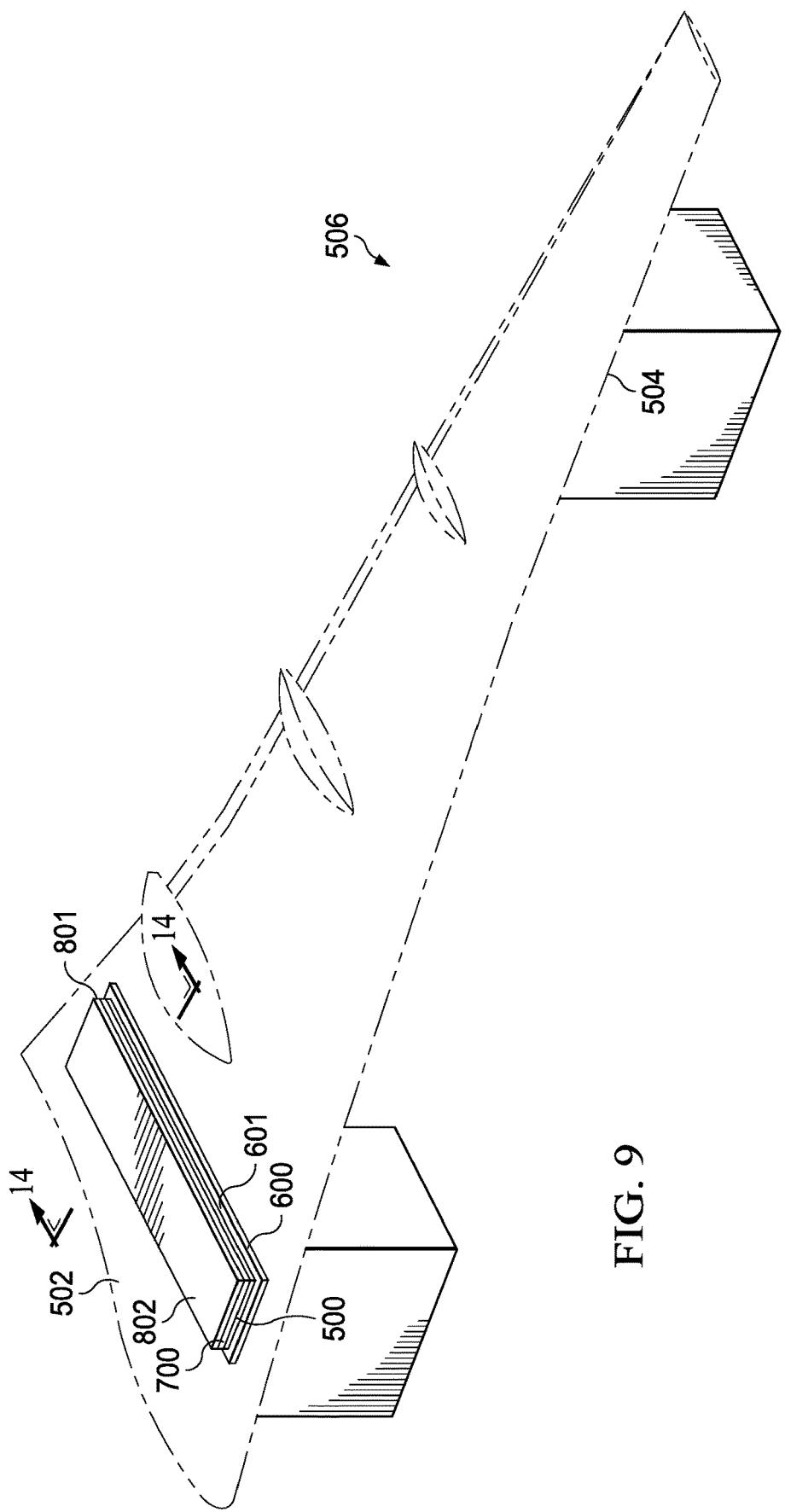
FIG. 9 is an illustration of a display panel attached to an aircraft structure in accordance with an illustrative embodiment.

With reference now to FIG. 9, an illustration of a display panel attached to an aircraft structure is depicted in accordance with an illustrative embodiment. In this example, the resin has been cured and caul plate 802 has been moved away from display panel 500.

In this particular example, resin barrier 600 remains after attachment of display panel 500. In another illustrative example, at least one of resin barrier 600 or film 700 may be removed. In this manner, desired airflow and other performance properties may be present when display panel 500 is attached to aircraft structure 504.

Figure 10:
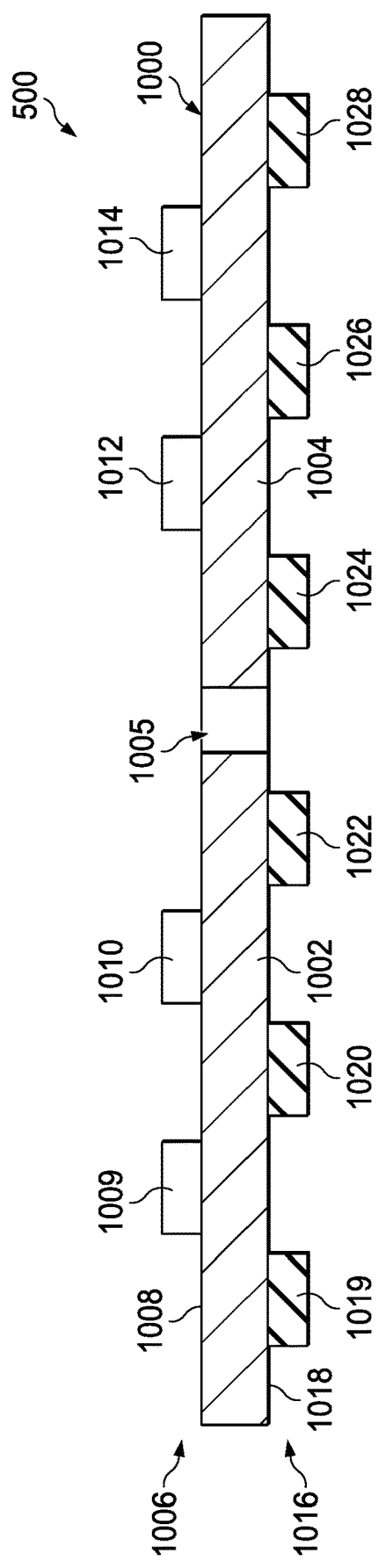
FIG. 10 is an illustration of a cross-section of a display panel in accordance with an illustrative embodiment.

Turning to FIG. 10, an illustration of a cross-section of a display panel is depicted in accordance with an illustrative embodiment. In this illustrative example, a cross-sectional view of display panel 500 is shown taken along lines 10-10 in FIG. 5.

In this view, display panel 500 includes substrate 1000. As depicted, substrate 1000 is comprised of strip 1002 and strip 1004.

In this illustrative example, strip 1002 and strip 1004 are flexible strips with gap 1005 between strip 1002 and strip 1004. As depicted, the flexible strips may bend to conform to a surface of an aircraft structure without undesired stresses occurring in the flexible strips.

Light-emitting elements 1006 are shown on top side 1008 of substrate 1000 in display panel 500. Light-emitting elements 1006 include light-emitting element 1009, light-emitting element 1010, light-emitting element 1012 and light-emitting element 1014.

As depicted in this sectional view, spacing elements 1016 are present on bottom side 1018 of substrate 1000. In this view, spacing elements 1016 include spacing element 1019, spacing element 1020, spacing element 1022, spacing element 1024, spacing element 1026, and spacing element 1028. The spacing elements are configured to cause display panel 500 to have a desired shape when attached to surface 502 of aircraft structure 504.

In this illustrative example, spacing elements 1016 are only shown on bottom side 1018 of substrate 1000. In the illustrative example, spacing elements 1016 may be at least one of electronic elements or structural elements in display panel 500. Light-emitting elements 1006 on top side 1008 of substrate 1000 also may function as spacing elements 1016 in addition to providing a display of information.

Figure 11:
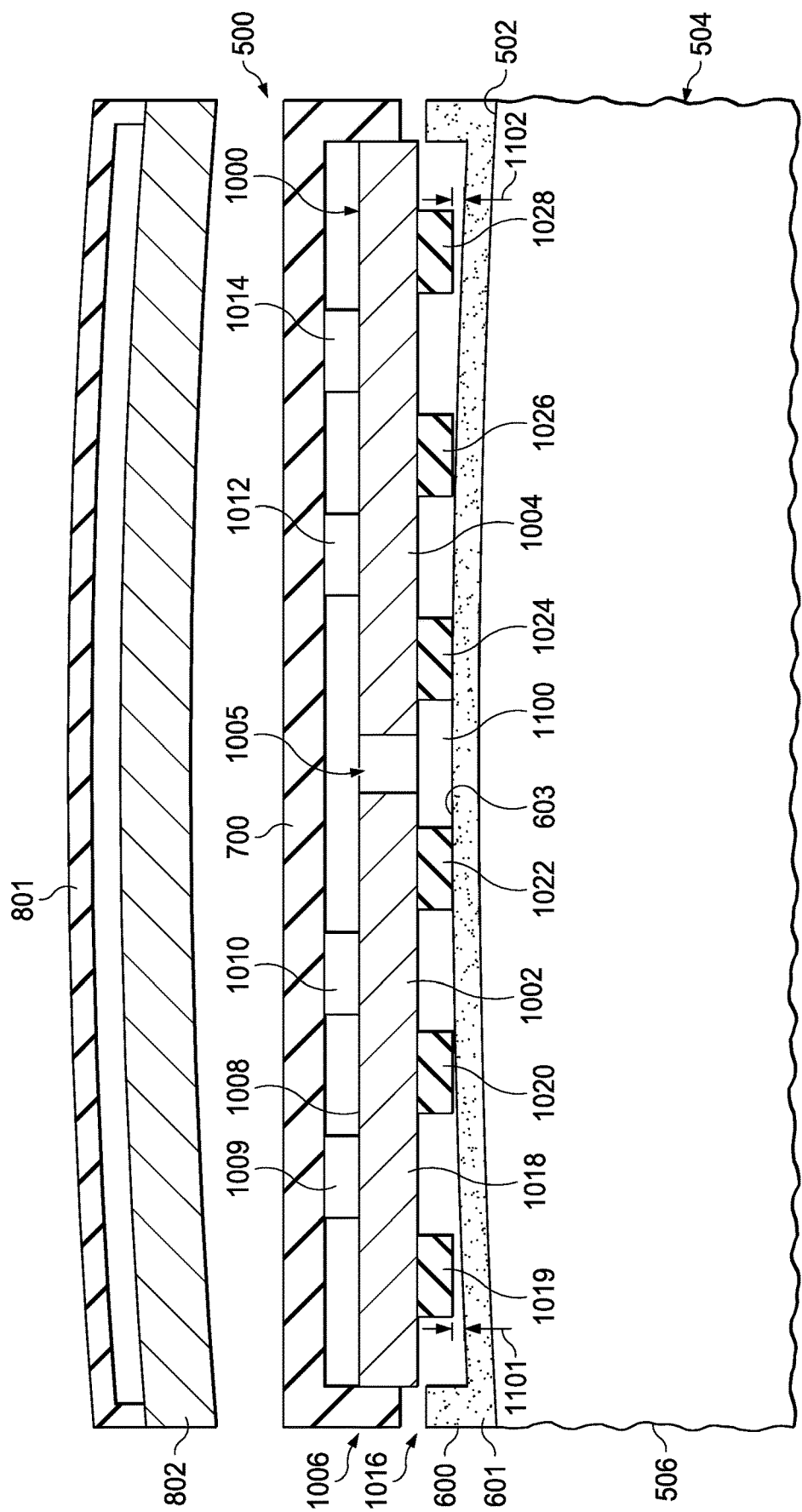
FIG. 11 is an illustration of a cross-section of a display panel positioned on a resin barrier and an aircraft structure in accordance with an illustrative embodiment.

With reference next to FIG. 11, an illustration of a cross-section of a display panel positioned on a resin barrier and an aircraft structure is depicted in accordance with an illustrative embodiment. As depicted in this figure, a cross-sectional view of display panel 500 positioned adjacent to resin barrier 600 on surface 502 of aircraft structure 504 is shown taken along lines 11-11 in FIG. 8A.

The positioning of display panel 500 within resin barrier 600 forms cavity 1100. As shown, cavity 1100 is defined by display panel 500, film 700, resin barrier 600, and surface 502.

As can be seen in this view, caul plate 802 is positioned over display panel 500, but is not applying force to display panel 500. Display panel 500 has a first shape that is substantially planar. Surface 502 has a second shape that is curved. As can be seen, gap 1101 and gap 1102 are present between bottom side 1018 of display panel 500 and surface 502 of aircraft structure 504.

As depicted, spacing element 1022 and spacing element 1024 touch surface 502. However, spacing element 1019, spacing element 1020, spacing element 1026, and spacing element 1028 do not touch surface 502.

Figure 12:
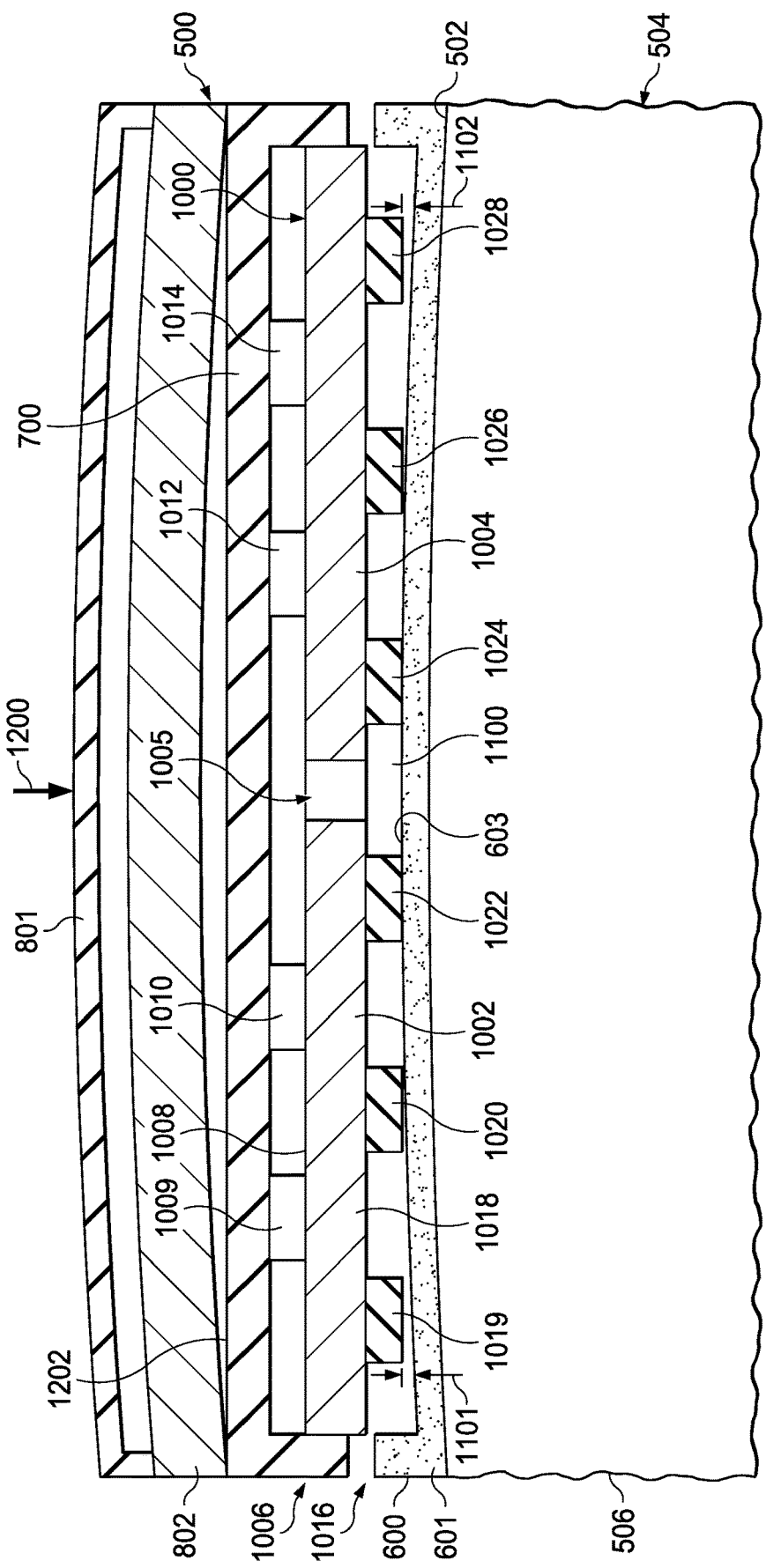
FIG. 12 is an illustration of a cross-section of a display panel positioned within a resin barrier and an aircraft structure with a force applied to the display panel in accordance with an illustrative embodiment.

Turning next to FIG. 12, an illustration of a cross-section of a display panel positioned within a resin barrier and an aircraft structure with a force applied to the display panel is depicted in accordance with an illustrative embodiment. Another cross-sectional view of display panel 500 positioned within resin barrier 600 on surface 502 of aircraft structure 504 is shown taken along lines 11-11 in FIG. 8A. In this view, force is applied by caul plate 802 in the direction of arrow 1200. In this cross-sectional view, the force applied by caul plate 802 causes spacing element 1019, spacing element 1020, spacing element 1022, spacing element 1024, spacing element 1026, and spacing element 1028 to touch surface 502.

As shown in this figure, the force applied by caul plate 802 causes display panel 500 to bend. This bending causes the first shape of display panel 500 to change and conform to the second shape of surface 502. In other words, display panel 500 now has a curve that is substantially similar to the curve of surface 502.

Additionally, light-emitting elements 1006 on top side 1008 of substrate 1000 also function as spacing elements 1016. In this example, light-emitting elements 1006 touch mating surface 1202 on caul plate 802 when display panel 500 bends. As depicted, light-emitting elements 1006 touch caul plate 802 indirectly through film 700.

Figure 13:
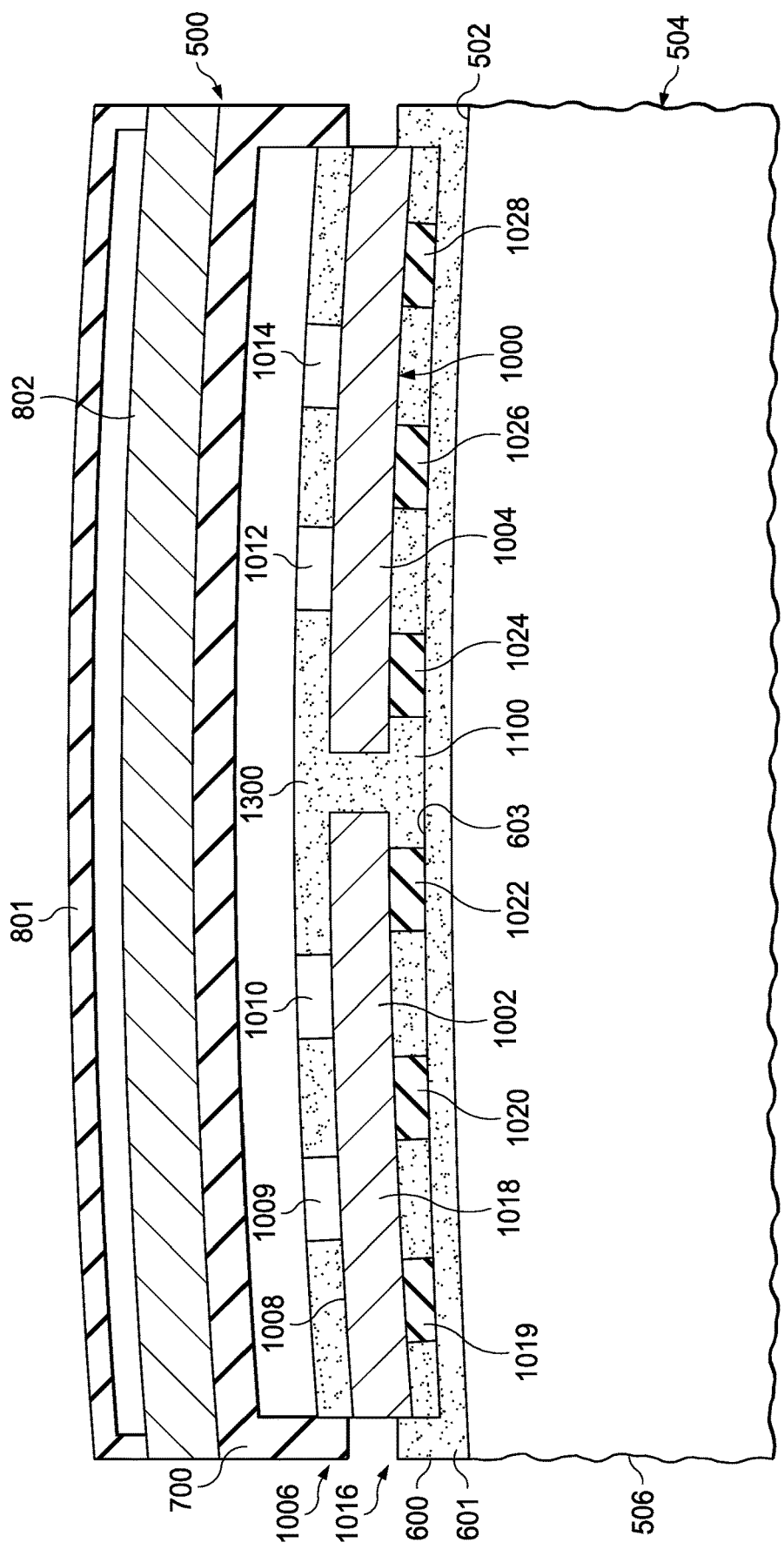
FIG. 13 is an illustration of a cross-section of resin in a cavity of a display panel while a force is applied to the display panel in accordance with an illustrative embodiment.

Turning next to FIG. 13, an illustration of a cross-section of resin in a cavity of a display panel while a force is applied to the display panel is depicted in accordance with an illustrative embodiment. A cross-sectional view of display panel 500 positioned within resin barrier 600 on surface 502 of aircraft structure 504 is shown taken along lines 11-11 in FIG. 8A.

In this view, resin 1300 has been injected into cavity 1100. Resin 1300 is present on both top side 1008 and bottom side 1018 through gap 1005 between strip 1002 and strip 1004 in display panel 500. In this view, resin 1300 encapsulates light-emitting elements 1006.

Figure 14:
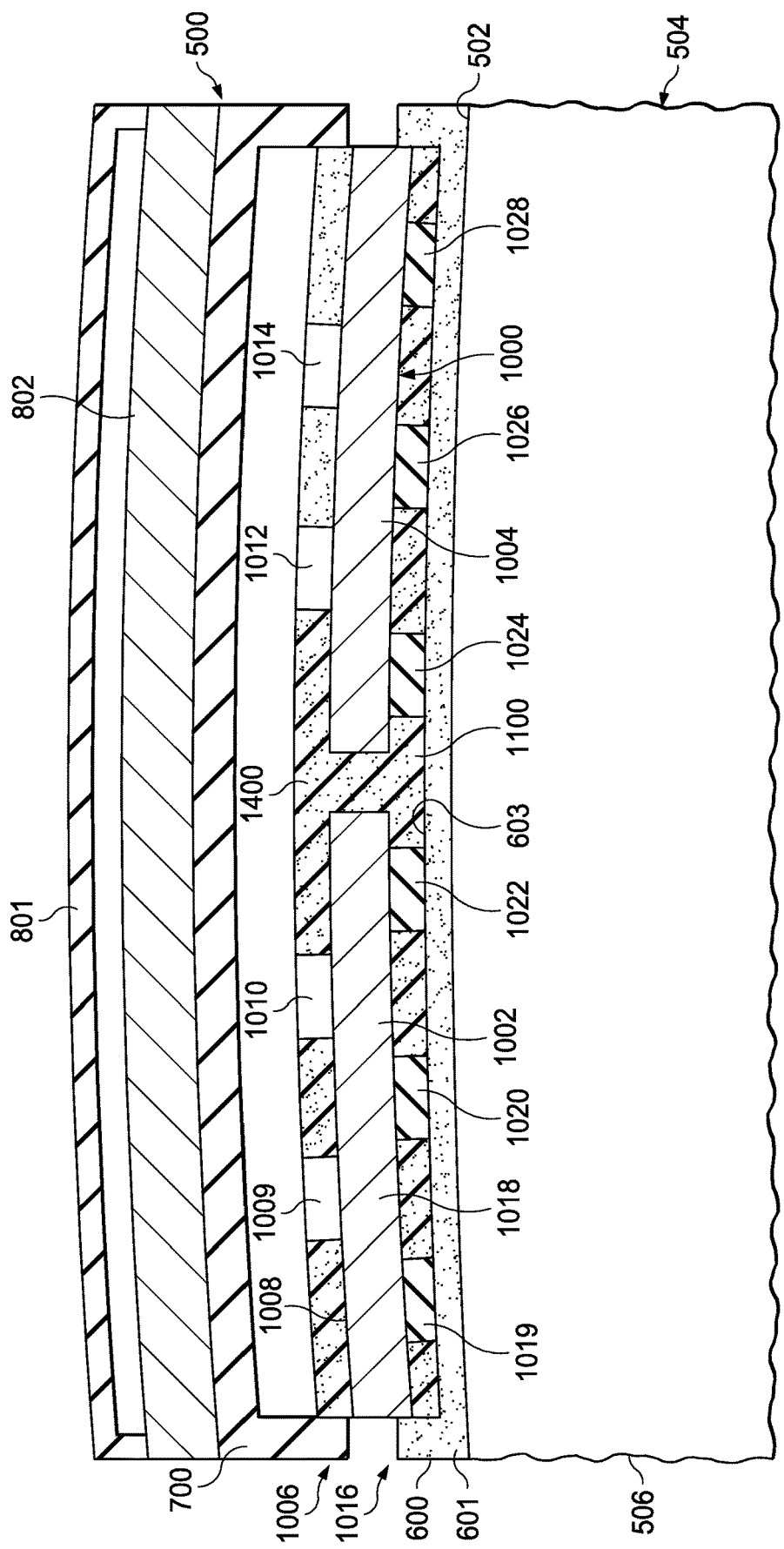
FIG. 14 is an illustration of a cross-section of cured resin in a cavity of a display panel in accordance with an illustrative embodiment.

With reference next to FIG. 14, an illustration of a cross-section of cured resin in a cavity of a display panel is depicted in accordance with an illustrative embodiment. A cross-sectional view of display panel 500 positioned within resin barrier 600 on surface 502 of aircraft structure 504 is shown taken along lines 14-14 in FIG. 9.

When resin 1300 is cured to form cured resin 1400, cured resin 1400 may protect light-emitting elements 1006, insulate light-emitting elements 1006, or provide some other function.

Cured resin 1400 holds display panel 500 in the first shape that substantially conforms to the second shape of surface 502. In other words, display panel 500 has a shape that changes to the first shape to match the second shape. With the use of caul plate 802 applying a force on display panel 500, display panel 500 may be attached to surface 502 with a desired shape. Additionally, this process also reduces at least one of the presence of wrinkles, disbonds, undesired thickness variation, or stresses that may be present with display panel 500 being a flexible display panel.

Figure 15:
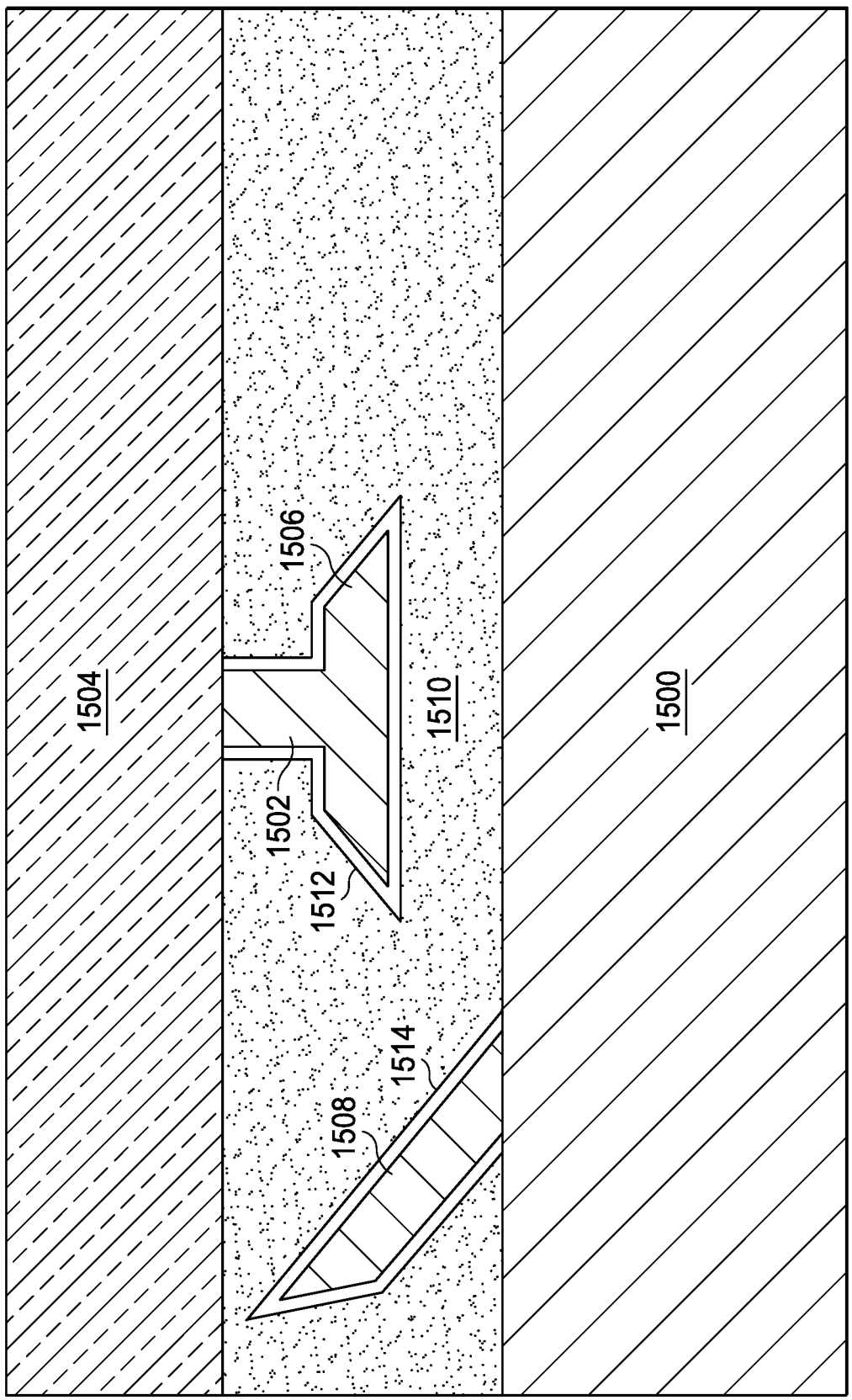
FIG. 15 is an illustration of mechanical attachment features in accordance with an illustrative embodiment.

In FIG. 15, an illustration of mechanical attachment features is depicted in accordance with an illustrative embodiment. In this illustrative example, surface 1500 is a surface for an aircraft structure on which the display panel is to be attached. Spacing element 1502 is an example of a spacing element that may be used on display panel 1504.

As depicted, spacing element 1502 includes mechanical attachment feature 1506. Additionally, surface 1500 has mechanical attachment feature 1508.

During attachment of the display panel 1504 to surface 1500, resin 1510 flows around mechanical attachment feature 1506 and mechanical attachment feature 1508. When resin 1510 is cured, the resin 1510 in this cured form mechanically attaches display panel 1504 to surface 1500 through mechanical attachment feature 1506 and mechanical attachment feature 1508. This mechanical attachment may be in addition to a bond that may be generated between the resin and the display panel. For example, fasteners, double-sided tape, adhesive, or other mechanisms may be used.

In this illustrative example, air gap 1512 and air gap 1514 are present. These air gaps may allow for some movement in a manner that produces stress within display panel 1504. These air gaps are optional.

The air gaps may be filled with a material such as a polymer, an elastomer, or some other suitable material. As depicted, the material in the air gaps is softer than resin 1510 when resin 1510 is cured. In this manner, the air gaps may be filled and may allow surface 1500 of the aircraft structure to move with respect to display panel 1504. In other cases, the material may be selected for use in resin 1510 that also reduces stress within display panel 1504.

The illustration of the display panels in different features in FIGS. 4-15 are presented only as examples of some implementations for attaching display panels to the surfaces of aircraft structures. These illustrations are not meant to limit the manner in which other illustrative examples may be implemented. For example, spacing structures may be used on a top side of the display panel in addition to or in place of using display elements as spacing structures. In another example, spacing structures may be located on both sides of a display panel and may comprise any number of components and structures that form the display panel.

In still other illustrative examples, other devices other than display elements may function as spacing structures on the top side of a display panel. In another illustrative example, electronic components may be present on the bottom side of a display panel. These electronic components and the bottom side may function as spacing structures in some illustrative examples. As another example, the display panel has a substrate that is a single strip rather than multiple strips.

The process illustrated in FIGS. 4-15 may be used to attach display panel 500 to structures other than an aircraft structure in the form of a wing. For example, display panel 500 may be attached to a vertical stabilizer, a winglet, an engine housing, a fuselage, a fairing, or other aircraft structures in a similar manner.

In yet another illustrative example, a crawler may be used in place of robotic arm 602. For example, a crawler may hold caul plate 802 and bladder 801.

As another example, caul plate 802 and bladder 801 may be held in place using a number of straps or other mechanism that holds caul plate 802 and bladder 801 in place with respect to aircraft structure 504. In other illustrative examples, display panel 500 may be bent to become substantially flat when surface 502 is substantially flat.

Figure 16:
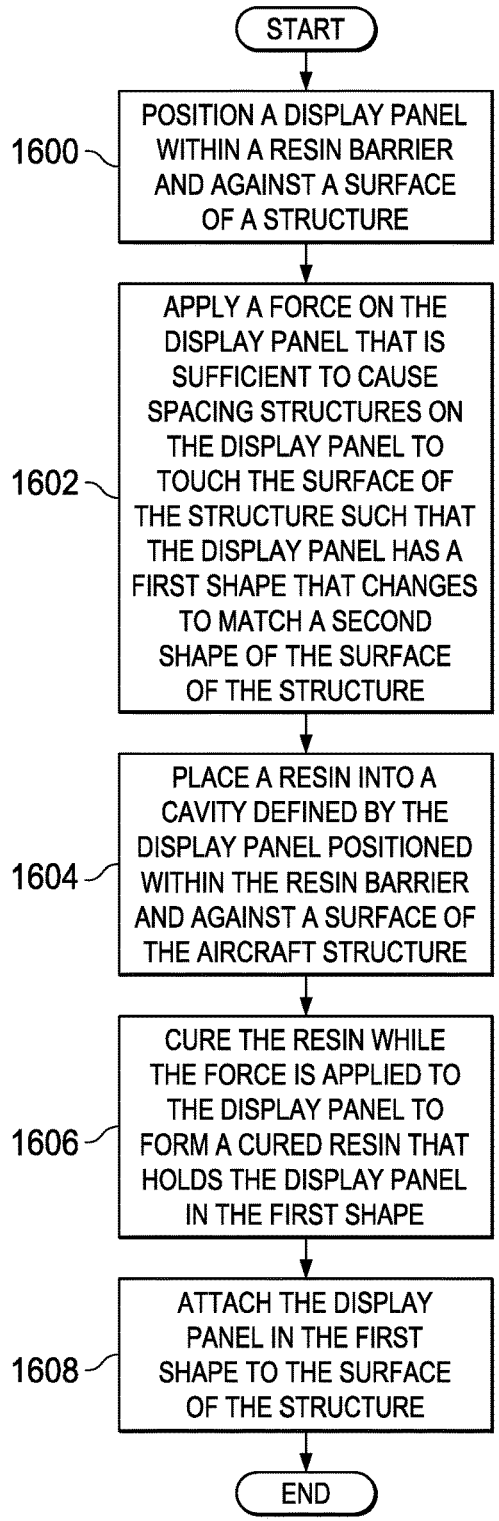
FIG. 16 is an illustration of a flowchart of a process for conforming a display panel in accordance with an illustrative embodiment.

With reference now to FIG. 16, an illustration of a flowchart of a process for conforming a display panel is depicted in accordance with an illustrative embodiment. The process illustrated in FIG. 16 may be implemented in information display environment 100 in FIG. 1. In particular, the process may be implemented for use in attaching display panel 120 to surface 114 of vehicle 102.

The process begins by positioning a display panel within a resin barrier and against a surface of a structure (operation 1600). The positioning is such that a bottom side of the display panel is against the surface of the aircraft structure.

A force is applied on the display panel that is sufficient to cause spacing structures on the display panel to touch the surface of the structure such that the display panel has a shape that changes to a first shape to match a second shape of the surface of the structure (operation 1602). In this manner, the display panel is conformed to the surface of the structure. Also, in operation 1602, the desired shape may be a first shape that substantially conforms to a second shape of the surface of the aircraft. In other illustrative examples, the desired shape may not substantially conform to or match a second shape of the surface, but may form an aerodynamic structure that generates a desired airflow when the vehicle is an aircraft in flight.

The spacing structures touching the surface of the aircraft structure in operation 1602 may be an indirect touching in some illustrative examples. For example, when the resin barrier includes both a perimeter wall and a surface layer, the surface layer is located between the spacing structures and the surface of the structure. The first shape of the display panel is a shape that is the same as the second shape of the surface of the vehicle. In the illustrative example, the first shape may bend to match the second shape.

The process then places a resin into a cavity defined by the display panel positioned within the resin barrier and against the surface of the aircraft structure (operation 1604). The cavity may also be defined by the caul plate, the film, the release ply, or other structures that may be used in attaching the display panel to the surface of the aircraft. The display panel may include spaces or volumes that are part of the cavity. The process cures the resin while the force is applied to the display panel to form a cured resin that holds the display panel in the first shape (operation 1606).

In operation 1606, the display panel has a shape that conforms to the shape of the surface of the vehicle. The conformation results in the shapes being matched. The cured resin may also hold the display panel to the surface of the vehicle in some illustrative examples.

The process then attaches the display panel in the first shape to the surface of the structure (operation 1608) with the process terminating thereafter. The attachment may be made using a number of different mechanisms. For example, at least one of double-sided tape, adhesive, fasteners, or other suitable attachment mechanisms may be used.

Attachment of display panel 120 may also use any combination of the following mechanisms such as resin primary bonding using resin 306, tape and secondary adhesive bonding, a mechanical attachment system, or fasteners. Mechanical attachment systems may include using hooks or cured resin 316 holding mechanical attachment features. These mechanical attachment features may be found on at least one of display panel 120 or surface 114 of aircraft structure 115.

Figure 17:
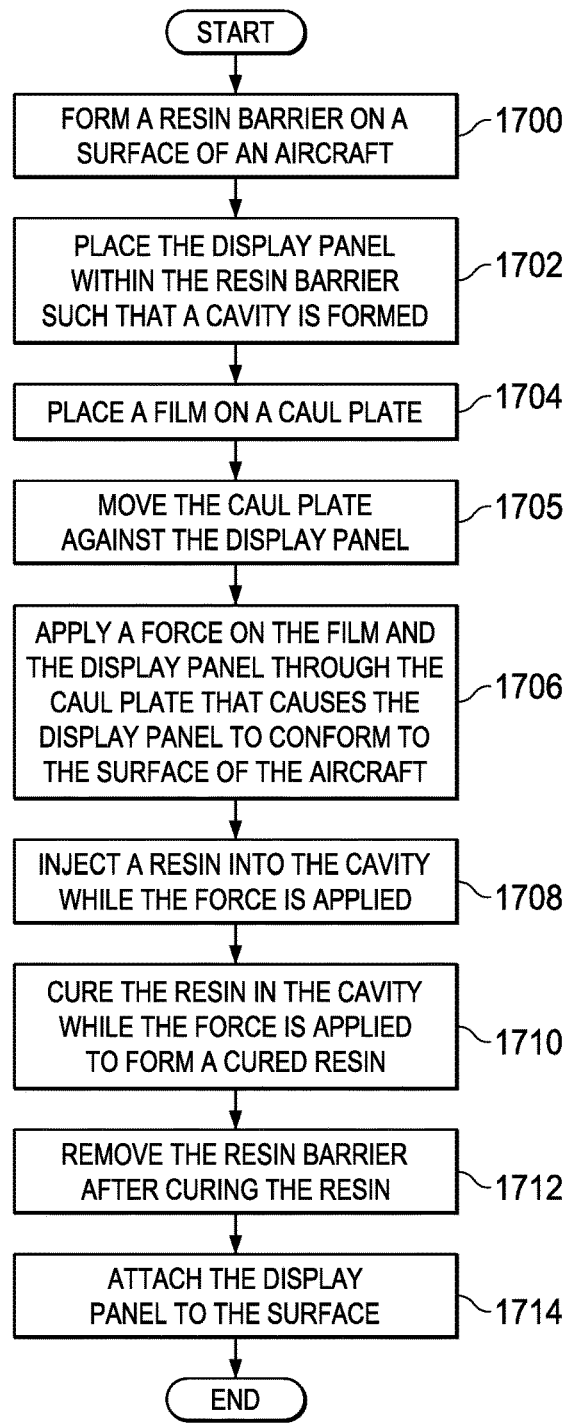
FIG. 17 is an illustration of a flowchart of a process for conforming and attaching a display panel to the surface of an aircraft in accordance with an illustrative embodiment.

With reference next to FIG. 17, an illustration of a flowchart of a process for conforming and attaching a display panel to the surface of an aircraft is depicted in accordance with an illustrative embodiment. The process illustrated in FIG. 17 may be implemented in information display environment 100 in FIG. 1.

The process begins by forming a resin barrier on a surface of an aircraft (operation 1700). The process places the display panel within the resin barrier such that a cavity is formed (operation 1702). In this operation, the cavity is an open cavity that is not fully enclosed by structures. In other words, the cavity may have one or more openings.

A film is placed on a caul plate (operation 1704). The caul plate is moved against the display panel (operation 1705). In operation 1702, the cavity may become a closed cavity when openings are not present. Additionally, in operation 1704, a bladder may also be moved with the caul plate against the display panel.

A force is applied on the film and the display panel through the caul plate that causes the display panel to conform to the surface of the aircraft (operation 1706). The process injects a resin into the cavity while the force is applied (operation 1708). The process cures the resin in the cavity while the force is applied to form a cured resin (operation 1710). The shape of the display panel conforms to the shape of the surface of the aircraft. The cured resin causes the display panel to maintain the shape. The cured resin may also hold the display panel on the surface of the aircraft.

The process removes the resin barrier after curing the resin (operation 1712). The process then attaches the display panel to the surface (operation 1714). In this case, double-sided tape, adhesive, fasteners, other devices, or some combination thereof may be used to attach the display panel to the surface of the aircraft. The process terminates thereafter.

The film on the caul plate may be a protective film for the display panel that remains attached to the display panel. Alternatively, the film may be a release film that is removed.

Figure 18:
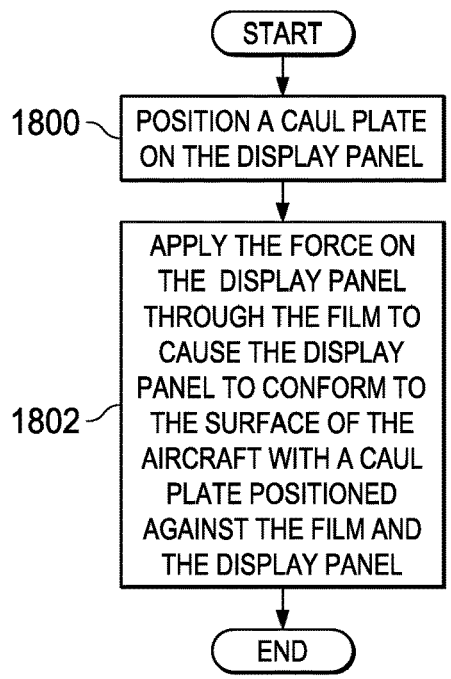
FIG. 18 is an illustration of a flowchart of a process for applying a force on a display panel in accordance with an illustrative embodiment.

With reference to FIG. 18, an illustration of a flowchart of a process for applying a force on a display panel is depicted in accordance with an illustrative embodiment. The process illustrated in FIG. 18 is an example of an implementation for operation 1708 in FIG. 17.

The process begins by positioning a caul plate on the display panel (operation 1800). In operation 1800, the caul plate may include a bladder. Also, in operation 1800, the film is located on the caul plate. The process applies the force on the display panel through the film to cause the display panel to conform to the surface of the aircraft with a caul plate positioned against the film and the display panel (operation 1802) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. For example, some the operations may be implemented using robotic arms, automated manufacturing equipment, or other suitable devices. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In some illustrative examples, operation 1608 may be omitted from the flowchart in FIG. 16. The curing of the resin may result in the display panel being attached to the surface of the aircraft structure. Mechanical attachment features such as those shown in FIG. 15 may be used.

As another example, the film may be placed on an optionally cured display panel prior to placing the display panel within the resin barrier in FIG. 17. In other illustrative examples, the operations may place the film and the display panel together instead of the film being located on the caul plate. This placement may occur when the film has a thickness that is applied in a manner that does not result in wrinkles when placed on the display panel.

As another example, finishing operations may be performed after removing the resin barrier in operation 1712. In another illustrative example, operation 1712 may be omitted.

In still another example, the process in FIG. 16 may include other operations such as secondary bonding of the display panel to the aircraft. Additional operations may include bonding the display panel to the aircraft with tape or connecting the display panel to the aircraft using fasteners. For example, the display panel may be attached to the surface through bonding using at least one of double-sided tape, adhesive, or some other bonding system. As another illustrative example, the display panel may be held on the surface by a mechanical attachment system such as fasteners, clips, screws, bolts, or some other suitable types of attachment systems. Attachment of display panel 120 may also use any combination of the following mechanisms such as resin primary bonding using a resin, a tape, secondary adhesive bonding, mechanical attachment, or fasteners. Mechanical attachments may include hooks or cured resin 316 holding mechanical attachment features.

In yet another example, an operation may be added to the flowchart in FIG. 17 after operation 1712 that places a film on an exterior surface of the display panel. This film may be a protective layer and may extend beyond the display panel surface and onto the surface of the aircraft. The film may function as a barrier to the environment, an air flow modifier, a static charge dissipater, or a surface protector. The surface protectant may protect against surface abrasion, ultraviolet light, or other undesired environmental impingement. For example, the film may be a protective film that reduces or prevents moisture from reaching the interior of the display panel.

As an additional example, operation 1714 may be omitted when the cured resin also functions to attach the display panel to the surface of the aircraft. Operation 1714 may also be used to provide additional strength or durability in attaching the display panel to the surface of the aircraft.

Figure 19:
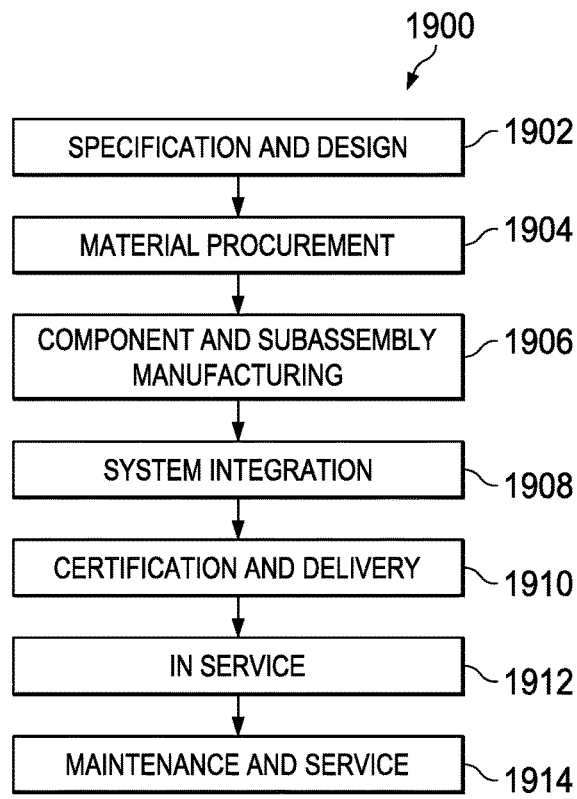
FIG. 19 is an illustration of a block diagram of an aircraft manufacturing and service method in accordance with an illustrative embodiment.
Figure 20:
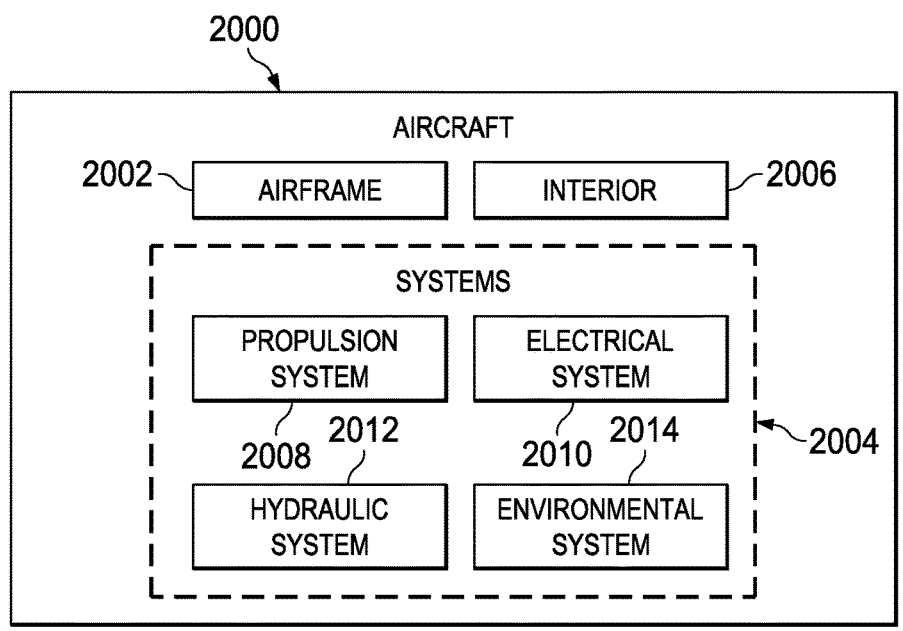
FIG. 20 is an illustration of a block diagram of an aircraft in which an illustrative embodiment may be implemented.

Illustrative embodiments of the disclosure may be described in the context of aircraft manufacturing and service method 1900 as shown in FIG. 19 and aircraft 2000 as shown in FIG. 20.

Turning first to FIG. 19, an illustration of a block diagram of an aircraft manufacturing and service method is depicted in accordance with an illustrative embodiment. During preproduction, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 may go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by at least one system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, an individual, and so on.

With reference now to FIG. 20, an illustration of a block diagram of an aircraft is depicted in which an illustrative embodiment may be implemented. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19. In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19. One or more apparatus embodiments, method embodiments, or a combination thereof may be utilized while aircraft 2000 is in service 1912, during maintenance and service 1914, or both while aircraft 2000 is in service 1912 and during maintenance and service 1914 in FIG. 19. For example, display panels installed on aircraft 2000 may be used during these phases. The use of a number of the different illustrative embodiments may substantially expedite the assembly, reduce the cost, or expedite assembly and reduce cost of aircraft 2000.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

This, the examples provided method and apparatus for attaching a display panel to the surface of an aircraft in the desired manner. In one illustrative example, the display panel is attached in a manner that reduces stress, wrinkling, disbonds, or some combination thereof in the display panel. A resin barrier is formed on a surface of an aircraft structure. The display panel is positioned within the resin barrier formed on the surface of the aircraft structure. In some cases, the resin barrier may be part of the display panel. In other examples, the resin barrier may be part of the caul plate or the resin barrier may be part of the film. A resin is placed into a cavity defined by the display panel positioned within the resin barrier. A force is applied on the display panel that is sufficient to cause spacing structures on the display panel to touch the surface of the aircraft structure such that the display unit has a desired shape. The shape may result in a desired surface profile when the display panel is attached to the surface of the aircraft structure. The resin is cured while the force is applied to the display panel to form a cured resin that may encapsulate the display panel. The encapsulation may be a full or partial encapsulation of the display panel. For example, a partial encapsulation may only fill the cavity. As another example, a partial encapsulation may fill the cavity and cover a portion of the top of the display panel. The structure formed by the cured resin and the display panel may be attached to the surface of the aircraft structure with the first shape.

The force is applied while the display panel is held in place within the resin barrier. With the force, these components, along with the surface of the aircraft structure, form the shape of the display panel that may be encapsulated and maintained by the cured resin. With this shape, the display panel may be attached by the cured resin to the aircraft and other attachment mechanisms after curing, or the display panel may be cured, removed, and attached at a later time to the surface of the aircraft structure at the same location.

Thus, one or more of the illustrative examples overcome the technical problem of attaching display panels to the surface of an aircraft in a manner that reduces stresses to the display panels attached to the surface of an aircraft. The illustrative examples may also reduce at least one of profile mismatches, stress wrinkles, disbonds, undesired thickness variations, or other undesired conditions for the display panel. As a result, less rework and maintenance may occur. Also, improved display panel and aircraft performance, fit, and finish also may result from using a display panel attached to an aircraft in an illustrative example.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for conforming a display panel to a surface of an aircraft structure, the method comprising:
    positioning the display panel within a resin barrier that is located on the surface such that a cavity is formed;
    applying a force on the display panel that causes the display panel to conform to the surface of the aircraft structure, wherein the display panel has a shape that changes to a first shape to match a second shape of the surface of the aircraft structure;
    injecting a resin into the cavity while the force is applied; and
    curing the resin in the cavity while the force is applied to form a cured resin, wherein the cured resin holds the display panel in the first shape and attaches the display panel to the surface of the aircraft structure.

2. The method of claim 1 further comprising:
    forming the resin barrier on the surface of the aircraft structure.

3. The method of claim 1 further comprising:
    placing a film and the display panel together, wherein placing the film and the display panel together comprises:
    positioning a caul plate against the display panel, wherein the film is located on the caul plate.

4. The method of claim 1, wherein the applying step comprises:
    positioning a caul plate against the display panel; and
    applying the force on the display panel that causes the display panel to conform to the surface of the aircraft structure with the caul plate positioned against the display panel.

5. The method of claim 1, wherein the force causes spacing structures on the display panel to touch the surface of the aircraft structure to cause the display panel to conform to the surface of the aircraft structure.

6. The method of claim 1, wherein a caul plate has a mating surface with a release layer on the mating surface that contacts the display panel.

7. The method of claim 1 further comprising:
    removing the resin barrier after curing the resin.

8. The method of claim 1, wherein the resin barrier is comprised of a material selected from at least one of a polymer, an insulating polymer, a film adhesive, a gel coat, an elastomer, an insulating elastomer, or a primer.

9. The method of claim 1, wherein the resin is selected from at least one of a substantially transparent resin, a thermoset resin, an epoxy, a polyimide, a polyurethane, a silicone, an acrylic, or a phenolic.

10. The method of claim 1, wherein the display panel is a flexible display panel having the shape that changes to the first shape that is substantially the same as the second shape of the surface without an undesired amount of stress imparted within the display panel.

11. The method of claim 1, wherein the display panel comprises light-emitting elements.

12. The method of claim 1, wherein the resin barrier is part of the display panel and is located on the surface when the display panel with the resin barrier is positioned on the surface.

13. The method of claim 1, further comprising placing a film and the display panel together.

14. The method of claim 1, further comprising positioning a caul plate against the display panel.

15. The method of claim 1, further comprising positioning a caul plate against the display panel, wherein a film is located on the caul plate.

16. The method of claim 1, further comprising applying the force on the display panel that causes the display panel to conform to the surface of the aircraft structure with a caul plate positioned against the display panel.

17. The method of claim 1, wherein the display panel comprises light-emitting elements associated with a substrate.

18. The method of claim 1, wherein the cured resin fills the cavity.

19. The method of claim 1, further comprising placing a film and the display panel together, wherein the cavity is formed by the film, the display panel, the surface of the aircraft structure, and the resin barrier.

20. The method of claim 1, wherein the force is applied on the display panel by inflating a bladder with a fluid.

* * * * *